United States Patent [19]
Sato

[11] Patent Number: 5,729,173
[45] Date of Patent: Mar. 17, 1998

[54] DEMODULATION OF QUADRATURE AMPLITUDE MODULATION SIGNALS

[75] Inventor: Yoichi Sato, Chiba-ken, Japan

[73] Assignee: Taisei Electric Incorporation, Itami, Japan

[21] Appl. No.: 668,374

[22] Filed: Jun. 18, 1996

[30] Foreign Application Priority Data

Sep. 20, 1995 [JP] Japan ................ 7-241270
Apr. 15, 1996 [JP] Japan ................ 8-092393

[51] Int. Cl.$^6$ .................................... H04L 27/38
[52] U.S. Cl. .................. 329/308; 375/233; 375/264; 375/266; 375/327; 375/345
[58] Field of Search ................... 329/306, 307, 329/308, 309; 375/261, 264, 266, 326, 327, 345, 233

[56] References Cited

U.S. PATENT DOCUMENTS

| | | |
|---|---|---|
| 4,574,246 | 3/1986 | Yoshida ................ 329/309 |
| 5,311,546 | 5/1994 | Paik et al. ............. 375/232 |
| 5,400,366 | 3/1995 | Iwamatsu .............. 375/344 |

Primary Examiner—Siegfried H. Grimm
Attorney, Agent, or Firm—Banner & Witcoff, Ltd.

[57] ABSTRACT

A quadrature amplitude modulation demodulator for receiving a quadrature amplitude modulated signal having a suppressed pilot signal. In the demodulator, a receiver unit converts received quadrature amplitude modulated signal into a frequency converted signal and a signal at a phase 90 degrees shifted from this frequency converted signal. A synchronous detector unit performs synchronous detection on the signals outputted by the receiver unit by detecting a frequency difference between a carrier of the frequency converted signal and a reference signal. Then, a phase detector unit performs phase detection on the synchronous detected signals by detecting a phase difference included in the synchronous detected signals. A detector unit detects transmitted data from the phase detected signal. The present invention also provides a demodulator which can accurately detect transmitted symbols from a received quadrature amplitude modulated signal having a suppressed carrier component, and enters into a fully receivable state in a reduced time from the start of reception, and a receiver which determines optimal sampling timing and an optimal amplification factor for a received signal by independent control schemes without mutual interference.

10 Claims, 23 Drawing Sheets

Fig. 1F

|   |   |   |   |   |   |   |   |
|---|---|---|---|---|---|---|---|
| (010000) | (010001) | (010101) | (010100) | (000100) | (000101) | (000001) | (000000) |
| ● | ● | ● | ● | ● | ● | ● | ● |
| (010010) | (010011) | (010111) | (010110) | (000110) | (000111) | (000011) | (000010) |
| ● | ● | ● | ● | ● | ● | ● | ● |
| (011010) | (011011) | (011111) | (011110) | (001110) | (001111) | (001011) | (001010) |
| ● | ● | ● | ● | ● | ● | ● | ● |
| (011000) | (011001) | (011101) | (011100) | (001100) | (001101) | (001001) | (001000) |
| ● | ● | ● | ● | ● | ● | ● | ● |
| (111000) | (111001) | (111101) | (111100) | (101101) | (101101) | (101001) | (101000) |
| ● | ● | ● | ● | ● | ● | ● | ● |
| (111010) | (111011) | (111111) | (111110) | (101110) | (101111) | (101011) | (101010) |
| ● | ● | ● | ● | ● | ● | ● | ● |
| (110010) | (110011) | (110111) | (110110) | (100110) | (100111) | (100011) | (100010) |
| ● | ● | ● | ● | ● | ● | ● | ● |
| (110000) | (110001) | (110101) | (110100) | (100100) | (100101) | (100001) | (100000) |
| ● | ● | ● | ● | ● | ● | ● | ● |

DEMODULATION OF QUADRATURE AMPLITUDE MODULATION SIGNALS

BACKGROUND OF THE INVENTION

1. Field of the Invention

The present invention relates to a quadrature amplitude modulation type demodulator for demodulating signals modulated in accordance with the quadrature amplitude modulation scheme.

2. Description of Related Art

A signal produced by amplitude modulating two base-band signals, generated independently of each other, with two quadrature carriers, respectively, and adding the resulting signals (a quadrature amplitude-modulated signal) can be demodulated by the following processing.

A demodulator, when receiving a quadrature amplitude modulated signal, either directly demodulates the received signal or converts the received signal into a signal at a predetermined frequency (intermediate frequency) before demodulation. Here, a demodulator which directly demodulates a received signal will be described. The demodulator generates a reference signal at the same frequency as one of carriers of a quadrature amplitude-modulated signal, and multiplies the received signal by the reference signal to produce a first demodulated signal. The demodulator also produces a signal at a phase 90 degrees shifted from the reference signal, and multiplies the received signal by this signal to produce a second demodulated signal. In this way, the demodulator performs synchronous detection on the received signal and detects two base-band signals from the first demodulated signal and the second demodulated signal, and then an equalizer detects transmitted data from these base-band signals.

For example, assuming that a received signal F is expressed by:

$$F = f_1(t) \times \cos(2\pi ft) + f_2(t) \times \sin(2\pi ft),$$

where $\cos(2\pi ft)$ and $\sin(2\pi ft)$ are carriers, and $f_1(t)$, $f_2(t)$ are base-band signals, a first demodulated signal p(t) produced by multiplying the received signal F by $\cos(2\pi ft)$ is expressed by:

$$p(t) = \tfrac{1}{2}[f_1(t) \cos(4\pi ft) + f_2(t) \sin(4\pi ft)]$$

Also, a second demodulated signal q(t) produced by multiplying the received signal F by $\sin(2\pi ft)$ is expressed by:

$$q(t) = \tfrac{1}{2}[f_2(t) - f_2(t)\cos(4\pi ft) + f_1(t)\sin(4\pi ft)]$$

Then, when the first and second demodulated signals p(t), q(t) are passed through filters to remove harmonic components, $$p(t) = \tfrac{1}{2} f_1(t)$$

$$q(t) = \tfrac{1}{2} f_2(t)$$

are derived. Thus, the base-band signals $f_1(t)$, $f_2(t)$ can be detected. The demodulator utilizes an equalizer to detect transmitted data from the detected base-band signals.

Incidentally, for the above-mentioned alternative demodulation, where a received signal is once converted into a signal at a predetermined frequency (intermediate frequency) and the converted signal is demodulated, a signal having the same frequency as the carrier of the frequency converted signal may be used as a reference signal.

As described above, the demodulator, for demodulating a received signal, must generate a signal at the same frequency as a carrier of the signal to be demodulated for the synchronous detection. For this reason, the transmitter side combines either one of carrier components (a pilot signal) with a signal to be outputted and transmits the combined signals, such that the demodulator extracts the pilot signal from a received signal to control the frequency and phase of a reference signal generated by an oscillator based on the extracted pilot signal.

Since the pilot signal does not contribute to the transmission of data, power transmitted by the pilot signal is regarded as useless. Specifically, when $A\cos(2\pi ft)$ is transmitted as a pilot signal, the power P transmitted by the pilot signal $P = A^2/2$ is useless power. Thus, the transmission of a signal not contributing to the transmission of data causes a problem that the efficiency of data communication is not so high.

To solve this problem, techniques for communicating data with a suppressed pilot signal have been devised to improve the efficiency of data communication. In this case, a demodulator requires either a control means for controlling an oscillator to generate a signal at the same frequency and phase as a carrier of a received signal to be demodulated, or a control means for removing distorted pulse waveforms possibly occurring in a synchronous detected signal due to an oscillator generating a signal which is not completely coincident with the pilot signal in frequency and phase. Thus, a demodulator provided with a configuration capable of performing such control is desired.

It is also desired from a practical point of view that a demodulator take a short time to enter into a state in which it can accurately detect transmitted symbols (fully receivable state) from the start of reception.

In general, a receiver in the digital communication amplifies a received signal by an appropriate amplification factor in order to compensate the received signal for attenuation due to a transmission path and so on, and samples the amplified received signal at appropriate timing to detect transmitted symbols from the received signal.

However, a conventional receiver controls the amplification factor for a received signal such that average power of sampled discrete signals is equal to average power of transmitted symbols. Thus, the amplification factor cannot be controlled to an optimal value before discrete signals sampled at optimal sampling timing are produced (a control for the sampling timing is completed). Stated another way, the control for the amplification ratio and the control for the sampling timing interfere with each other, so that they cannot be performed independently of each other. This causes a problem that the receiver takes a long time to enter into a state in which the receiver can accurately detect transmitted symbols from the starting of reception of signals. Also, since a control operation for controlling the sampling timing must be designed in consideration of a control operation for controlling the amplification factor, and, conversely, the control operation for controlling the amplification factor must be designed in consideration of the control operation for controlling the sampling timing, the design procedure for these control operations requires much labor and time. In addition, since a configuration for implementing the control operations is more complicated, a reduction in manufacturing cost cannot be expected for a receiver comprising such a configuration.

SUMMARY OF THE INVENTION

It is an object of the present invention to provide a quadrature amplitude modulation type demodulator which is capable of readily demodulating a received quadrature amplitude modulated signal having a suppressed pilot signal.

It is another object of the present invention to provide a demodulator which is capable of accurately detecting transmitted symbols from a received quadrature amplitude modulation signal having a suppressed pilot signal.

It is a further object of the present invention to provide a demodulator which requires a shorter time in transitioning to a fully receivable state from the start of reception.

It is a further object of the present invention to provide an apparatus which is capable of determining optimal sampling timing and optimal amplification factor for a received signal by independent control schemes which do not interfere with each other.

To achieve the above objects, the present invention provides, in a first embodiment thereof, quadrature amplitude modulation type demodulator having receiving means for receiving and outputting a quadrature amplitude modulated signal, an oscillator for outputting a reference signal, first demodulating means for multiplying a signal outputted by the receiving means by the reference signal to produce a first demodulated signal, second demodulating means for multiplying the signal outputted by the receiving means by a signal at a phase 90 degrees different from the reference signal to produce a second demodulated signal, and detecting means for detecting transmitted data from the first demodulated signal and the second demodulated signal. The quadrature amplitude modulation type demodulator comprises a first differentiating circuit for differentiating the first demodulated signal, a second differentiating circuit for differentiating the second demodulated signal, frequency difference detecting means for detecting a variate proportional to a difference in frequency between a carrier of the signal outputted by the receiving means and the reference signal, based on a signal produced by multiplying an output of the first differentiating circuit by the second demodulated signal and on a signal produced by multiplying an output of the second differentiating circuit by the first demodulated signal, and frequency control means for controlling the frequency of the reference signal outputted by the oscillator based on the variate proportional to the frequency difference detected by the frequency difference detecting means.

In the quadrature amplitude modulation type demodulator according to the first embodiment of the present invention, the receiving means receives and outputs a quadrature amplitude modulated signal. The signal outputted by the receiving unit is multiplied by the reference signal outputted by the oscillator to produce a first demodulated signal, while the received signal is multiplied by the signal at a phase 90 degrees different from the phase of the reference signal to produce a second demodulated signal. Subsequently, the demodulator differentiates the first demodulated signal in the first differentiating circuit, and multiplies the differentiated signal by the second demodulated signal. Also, the demodulator differentiates the second demodulated signal in the second differentiating circuit, and multiplies the differentiated signal by the first demodulated signal. Then, a variate proportional to a frequency difference between the reference signal and a carrier of the signal outputted by the receiving means is detected based on the two signals. The demodulator uses the variate proportional to the frequency difference thus detected to control the frequency of the reference signal outputted by the oscillator.

Thus, according to the first embodiment of the present invention, the demodulator can detect a frequency difference between a carrier of a signal to be demodulated and the reference signal to generate the reference signal at the same frequency as the frequency of the carrier of the signal to be demodulated. It is therefore possible to detect base-band signals, even when a quadrature amplitude modulated signal having a suppressed carrier is received, from the received signal, to demodulate the quadrature amplitude modulated signal in which number of in-phase and quadrature signal points is small such as two or the like, and to detect transmitted data from the demodulated signal.

The present invention provides, in the second embodiment, a quadrature amplitude modulation type demodulator having receiving means for receiving and outputting a quadrature amplitude modulated signal, an oscillator for outputting a reference signal, first demodulating means for multiplying a signal outputted by the receiving means by the reference signal to produce a first demodulated signal, second demodulating means for multiplying the signal outputted by the receiving means by a signal at a phase 90 degrees different from the reference signal to produce a second demodulated signal, and detecting means for detecting transmitted data from the first demodulated signal and the second demodulated signal, the quadrature amplitude modulation type demodulator further comprising a first cubing circuit for cubing the first demodulated signal, a second cubing circuit for cubing the second demodulated signal, phase difference detecting means for detecting a phase difference based on a signal produced by multiplying the first demodulated signal by an output of the second cubing circuit and on a signal produced by multiplying the second demodulated signal by an output of the first cubing circuit, and phase rotating means for rotating the phase of the first demodulated signal and the phase of the second demodulated signal based on the phase difference detected by the phase difference detecting means.

In the quadrature amplitude modulation type demodulator according to the second embodiment of the present invention, the receiving means receives and outputs a quadrature amplitude modulated signal. The signal outputted by the receiving means is multiplied by the reference signal outputted by the oscillator to produce a first demodulated signal, while the signal outputted by the receiving means is multiplied by a signal at a phase 90 degrees different from the phase of the reference signal to produce a second demodulated signal. The demodulator then cubes the first demodulated signal in the first cubing circuit, and multiplies this signal by the second demodulated signal. The demodulator also cubes the second demodulated signal in the second cubing circuit, and multiplies this signal by the first demodulated signal. Then, the phase difference detecting means detects, from these two signals, a phase difference between the reference signal and a carrier of the signal outputted by the receiving means. The demodulator uses a variate proportional to the phase difference to rotate the phases of the first demodulated signal and the second demodulated signal.

Thus, according to the second embodiment of the present invention, the demodulator can detect a phase difference between a carrier of a signal to be demodulated and the reference signal to generate the reference signal at the same phase as that of the carrier of the signal to be demodulated. It is therefore possible to detect base-band signals from the received signal, even if the received signal has a suppressed carrier. It is further possible to demodulate a quadrature amplitude modulated signal in which the number of in-phase and quadrature signal points is large, and to detect transmitted data from the demodulated signal.

The present invention provides, in a third embodiment, a quadrature amplitude modulation type demodulator having receiving means for receiving and outputting a quadrature amplitude modulated signal, an oscillator for outputting a reference signal, first demodulating means for multiplying a signal outputted by the receiving means by the reference signal to produce a first demodulated signal, second demodulating means for multiplying the signal outputted by the receiving means by a signal at a phase 90 degrees different from the reference signal to produce a second demodulated signal, and detecting means for detecting transmitted data from the first demodulated signal and the second demodulated signal, the quadrature amplitude modulation type demodulator further comprising a first differentiating circuit for differentiating the first demodulated signal, a second differentiating circuit for differentiating the second demodulated signal, frequency difference detecting means for detecting a variate proportional to a difference in frequency between a carrier of the signal outputted by the receiving means and the reference signal, based on a signal produced by multiplying an output of the first differentiating circuit by the second demodulated signal and on a signal produced by multiplying an output of the second differentiating circuit by the first demodulated signal, frequency control means for controlling the frequency of the reference signal outputted by the oscillator based on the variate proportional to the frequency difference detected by the frequency difference detecting means, a first cubing circuit for cubing the first demodulated signal, a second cubing circuit for cubing the second demodulated signal, phase difference detecting means for detecting a phase difference based on a signal produced by multiplying the first demodulated signal by an output of the second cubing circuit and on a signal produced by multiplying the second demodulated signal by an output of the first cubing circuit, and phase rotating means for rotating the phase of the first demodulated signal and the phase of the second demodulated signal based on the phase difference detected by the phase difference detecting means.

In the quadrature amplitude modulation type demodulator according to the third embodiment of the present invention, the receiving means receives and outputs a quadrature amplitude modulated signal. The signal outputted by the receiving unit is multiplied by the reference signal outputted by the oscillator to produce a first demodulated signal, while the received signal is multiplied by the signal at a phase 90 degrees different from the phase of the reference signal to produce a second demodulated signal. Subsequently, the demodulator differentiates the first demodulated signal in the first differentiating circuit, and multiplies the differentiated signal by the second demodulated signal. Also, the demodulator differentiates the second demodulated signal in the second differentiating circuit, and multiplies the differentiated signal by the first demodulated signal. Then, a variate proportional to a frequency difference between the reference signal and a carrier of the signal outputted by the receiving means is detected based on the two signals. The demodulator uses the variate proportional to the frequency difference thus detected to control the frequency of the reference signal outputted by the oscillator.

Also, the demodulator cubes the first demodulated signal in the first cubing circuit, and multiplies this signal by the second demodulated signal. The demodulator also cubes the second demodulated signal in the second cubing circuit, and multiplies this signal by the first demodulated signal. Then, the phase difference detecting means detects, from these two signals, a phase difference between the reference signal and the carrier of the signal outputted by the receiving means. The demodulator uses a variate proportional to the phase difference to rotate the phases of the first demodulated signal and the second demodulated signal.

Thus, according to the third embodiment of the present invention, the demodulator can detect a frequency difference between a carrier of a signal to be demodulated and the reference signal to generate the reference signal at the same frequency as the frequency of the carrier of the signal to be demodulated. The demodulator can also detect a phase difference between the carrier of the signal to be demodulated and the reference signal to rotate the phases of the demodulated signals. It is therefore possible to detect baseband signals, even when a signal having a suppressed carrier is received, from the received signal, as well as to demodulate a quadrature amplitude modulated signal, in which the number of in-phase and quadrature signal points is large and a carrier is at a high frequency, to detect transmitted data from the demodulated signals. In other words, high speed data communication can be realized.

Further, since the transmitter side need not add a pilot signal to a signal to be transmitted, the efficiency of the data transmission can be improved to 100%.

The present invention provides, in a fourth embodiment, a demodulator having an oscillator, a receiver unit for receiving a quadrature amplitude modulated signal, a first synchronous detector circuit for multiplying a received signal by an output of the oscillator, a second synchronous detector circuit for multiplying the received signal by a signal at a phase shifted by 90 degrees from the phase of the output of the oscillator, and an equalizer circuit for equalizing two synchronous detected signals from the first synchronous detector circuit and the second synchronous detector circuit to detect transmitted symbols, wherein the equalizer circuit includes first distorted pulse waveform removing means for removing distorted frequency components included in the two synchronous detected signals base on average power of transmitted symbols and on average power of the received signal, and for removing distorted phase components included in the two synchronous detected signals based on a signal produced by multiplying an output of the first synchronous detector circuit raised to $(2n+1)^{th}$ power by an output of the second synchronous detector circuit raised to $(2n-1)^{th}$ power and on a signal produced by multiplying the output of the first synchronous detector circuit raised to $(2n-1)^{th}$ power by the output of the second synchronous detector circuit raised to $(2n+1)^{th}$ power, where n is an integer.

Preferably, the equalizer circuit further includes second distorted pulse waveform removing means for removing distorted pulse waveforms present in the two synchronous detected signals using average power of detected transmitted symbols and average power of an equalized received signal, and signal quality data calculating means for calculating signal quality data based on a time average of a difference in power between a distorted pulse waveform removed signal and the detected transmitted symbols, wherein the first distorted pulse waveform removing means is stopped when the signal quality data is equal to or less than a predetermined value, and the second distorted pulse waveform removing means removes distorted pulse waveforms present in the two synchronous detected signals.

Further, the signal quality data calculating means is means for calculating the signal quality data for each of areas divided from a symbol constellation zone based on the distance of the center thereof, and the equalizer circuit may switch the first distorted pulse waveform removing means to the second distorted pulse waveform removing means for each of the areas.

Thus, according to the fourth embodiment of the present invention, the demodulator receives a quadrature amplitude modulated signal with a suppressed carrier and completely removes distorted pulse waveforms included in signals produced by performing synchronous detection on the received signal, so that transmitted symbols can be detected from the received signal.

Also, the provision of the second distorted pulse waveform removing means enables a reduction in time required to completely remove distorted pulse waveforms included in the synchronous detected signal.

Moreover, since the signal constellation zone is divided into a plurality of areas such that the first distorted pulse waveform removing means and the second distorted pulse waveform removing means can be switched for each of the areas, the time required to completely remove distorted pulse waveforms included in the synchronous detected signals can be further reduced.

The present invention provides, in a fifth embodiment, a receiver to which a transmitted symbol detecting method is applied, wherein the method comprises the steps of calculating a sum of the power of a first discrete signal produced by sampling a received signal at periods equal to transmission intervals of transmitted symbols and the power of a second discrete signal produced by sampling the received signal at sampling timing shifted by one half of the transmission interval with respect to the first discrete signal, and controlling an amplification factor for the received signal based on the sum.

In this configuration, assuming that the transmission interval of transmitted symbols in a received signal is designated by T, the amplification factor is controlled based on a sum of the power of a first discrete signal sampled at timing $t=nT+\tau$ ($\tau$ is a sampling phase shift) and the power of a second discrete signal sampled at timing $t=nT+\tau+T/2$.

The sum of the power of the first discrete signal and the power of the second discrete signal presents a value changing in proportion to the amplification factor irrespective of the sampling phase shift $\tau$. It can be therefore said that the amplification factor, presented when the sum of the power of the first discrete signal and the power of the second discrete signal is equal to a value produced from an attenuation compensated received signal (a reference value), is an optimal amplification factor. It is therefore possible to control the amplification factor to an optimal value based on the sum of the power of the first discrete signal and the power of the second discrete signal. In addition, since the control of the amplification factor is independently performed without being interfered by a control of the sampling timing, a time required to find the optimal amplification factor from the start of reception can be reduced. This further leads to reducing a time required for the receiver to proceed to a fully receivable state in which the receiver can detect transmitted symbols. Further, since a control operation for controlling the amplification factor can be designed without the need of considering a control operation for controlling the sampling timing, the designing can be readily achieved.

The receiver may be additionally provided with a configuration for controlling the sampling timing for a received signal based on a difference in power between the first discrete signal and the second discrete signal.

When the power of the first discrete signal is equal to the power of the second discrete signal, in other words, when a difference in power between the first discrete signal and the second discrete signal is zero, timing shifted by T/4 or −T/4 from the sampling timing of the first discrete signal is optimal sampling timing. It is therefore possible to sample a received signal at optimal sampling timing by controlling the sampling timing based on the difference in power between the first discrete signal and the second discrete signal.

Thus, according to the fifth embodiment of the present invention, the control for the amplification factor and the control for the sampling timing are independently performed for a received signal without mutual interference. For this reason, it is possible to reduce a time required for the receiver to proceed from the start of reception to a fully receivable state. In addition, since the control for the sampling timing and the control for the amplification factor can be designed independently of each other, the designing process is facilitated. Also, a simple configuration of the receiver resulting from this designing makes it possible to reduce the manufacturing cost thereof.

BRIEF DESCRIPTION OF THE DRAWINGS

The above and further objects and features of the present invention will be more apparently understood by referring to the following detailed description in conjunction with the accompanying drawings. It should be noted however that the drawings should be used exclusively for understanding the invention, and are not at all intended to limit the scope of the invention.

FIGS. 1A–1F illustrate a variety of signal constellation diagrams in the quadrature amplitude modulation scheme, where FIG. 1A illustrates a signal constellation diagram in 4 QAM; FIG. 1B in 16 QAM; FIG. 1C in 64 QAM and FIG. 1D in 256 QAM, FIG. 1E illustrates a rated signal constellation diagram when a demodulated signal includes a phase difference, and FIG. 1F illustrates a signal constellation diagram in 64 AQM with values corresponding to respective points;

DESCRIPTION OF THE PREFERRED EMBODIMENTS

Figure 1A:
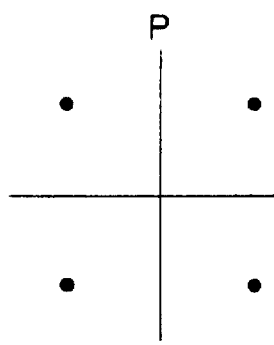
Figure 1B:
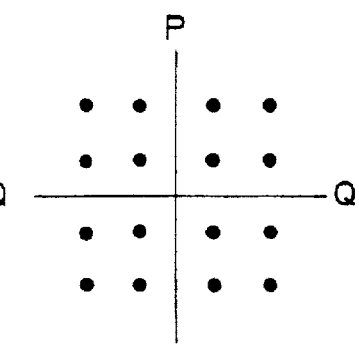

The quadrature amplitude modulation is realized by amplitude modulating two base-band signals, generated independently of each other, with two quadrature carriers, respectively, and adding the resulting signals. FIGS. 1A–1E illustrate examples of signal point constellation diagrams in the quadrature amplitude modulation. Specifically, each of in-phase and quadrature signals have two values in FIG. 1A; four values in FIG. 1B (16 QAM); and eight values in FIG. 1C (64 QAM). Also, FIG. 1D illustrates a symbol constellation diagram when each of in-phase and quadrature signals has 16 values (256 QAM).

For demodulating a quadrature amplitude modulated signal, if the frequency of a reference signal is not coincident with the frequency of the signal to be demodulated, the modulated signal is not a base-band signal, as mentioned above, so that transmitted data cannot be detected therefrom.

Figure 1C:
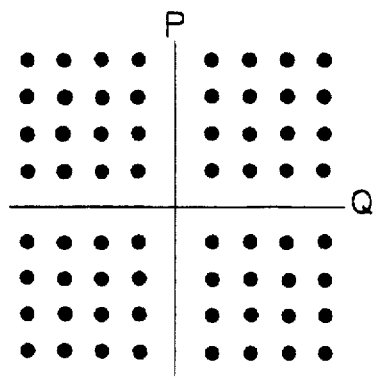
Figure 1D:
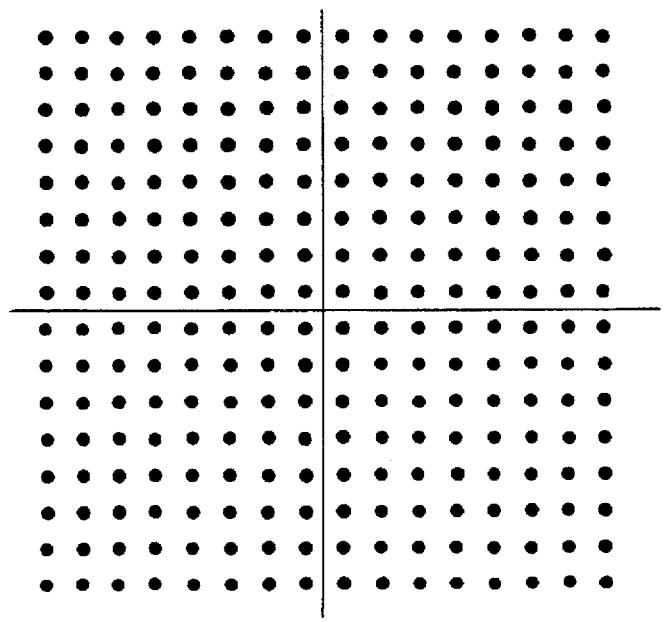
Figure 1E:
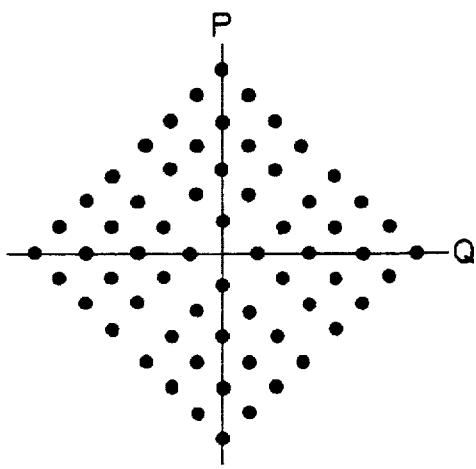

Also, if a signal to be demodulated only includes a component associated with a phase difference between the reference signal and the signal to be demodulated (assuming that the frequency of the reference signal is coincident with that of the signal to be demodulated), the signal point constellation of transmitted data detected by a demodulator is rotated as illustrated in FIG. 1E.

FIG. 1F illustrates which value each of 64 signal points in 64 QAM constellation of FIG. 1C corresponds to.

Generally, for demodulating a quadrature amplitude modulated signal, the phase of the signal to be demodulated, including a component associated with a phase difference between the reference signal and the signal itself may be rotated such that a deviation in signal point constellation between the transmitter side and the receiver side is stabilized at any of 0 degree, 90 degrees, 180 degrees, and 270 degrees positions in order to detect transmitted data. For example, when the signal point constellation on the transmitter side is deviated from the signal point constellation by 90 degrees, data detected on the receiver side are such that the P-axis and the Q-axis of the constellation diagram on the receiver side are replaced with the Q-axis and the P-axis of the constellation diagram on the transmitter side. However, transmitted data can be accurately detected by subjecting the detected data to coding processing. Similarly, accurate transmitted data can be detected also when a deviation in signal point constellation between the transmitter side and the receiver side is stabilized at 180 or 270 degrees.

If the number of signal points constituting each of in-phase and quadrature signals is small, such as two values, as illustrated in FIG. 1A, a signal demodulated when synchronous detection is performed includes a component associated with a phase difference between a reference signal and a carrier. Thus, even if the signal point constellation detected on the receiver side is rotated from the signal point constellation on the transmitter side, one of detected signals may be positioned at any signal point in order to detect transmitted data. In this way, a deviation in the signal point constellation between the transmitter side and the receiver side can be fixed at any of 0 degree, 90 degrees, 180 degrees, and 270 degrees. As will be appreciated from the above description, when each of in-phase and quadrature signals includes a small number of signal points such as two values, a quadrature amplitude modulated signal can be demodulated to detect transmitted data from the demodulated signal by generating in a demodulator a reference signal at a frequency coincident with the frequency of a carrier of the demodulated signal.

Now, embodiments of the present invention will be described in connection with a quadrature amplitude modulation type demodulator (hereinafter simply referred to as the "QAM demodulator") which receives and demodulates a quadrature amplitude modulated signal in which each of in-phase and quadrature signals has a small number of signal points such as two values. It should be noted herein that since the phase difference between a carrier and a reference signal does not affect the detection of transmitted data during demodulation, the description will be made on the assumption that the frequency of the carrier made coincident with that of the reference signal results in making the phase of the carrier coincident with that of the reference signal.

Figure 2:
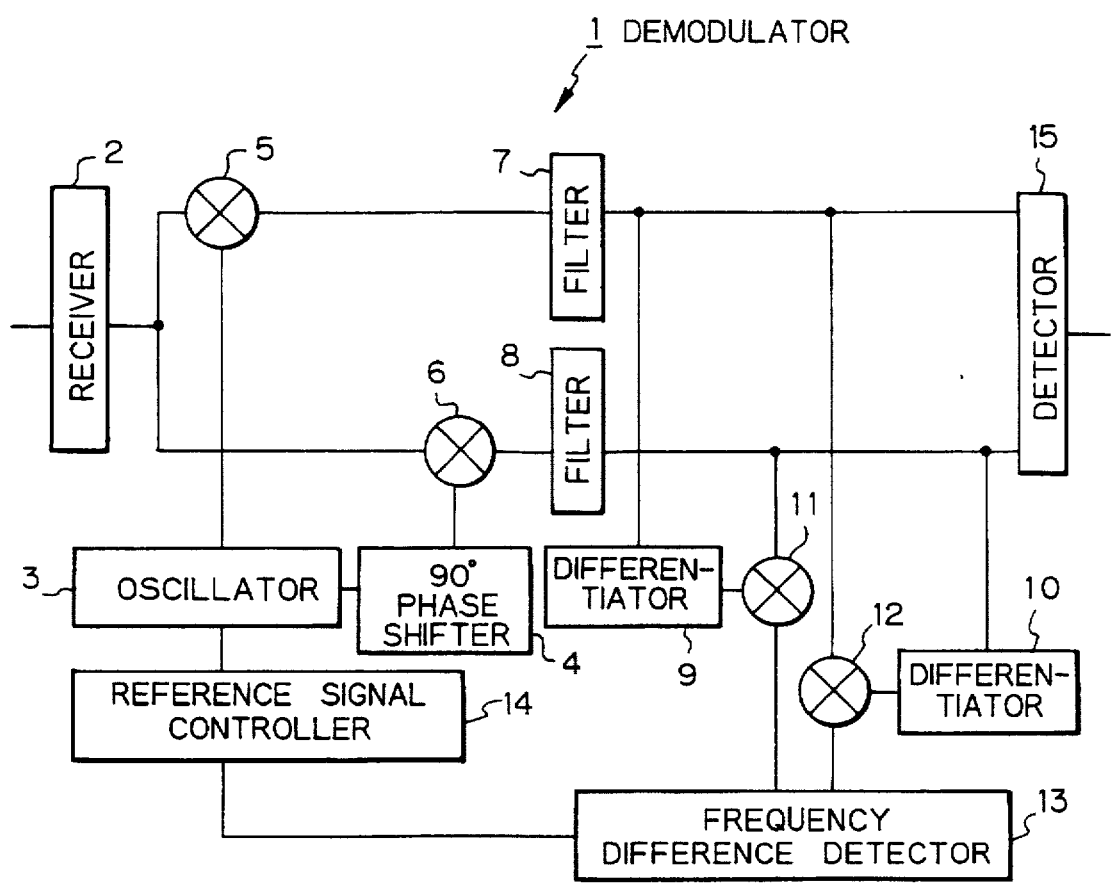
FIG. 2 is a block diagram illustrating the configuration of a QAM demodulator according to a first embodiment of the present invention.

FIG. 2 is a block diagram illustrating the configuration of a QAM demodulator according to a first embodiment of the present invention. A demodulator 1 comprises a receiver unit 2 for receiving and outputting a quadrature amplitude modulated signal; an oscillator unit 3 for generating a reference signal; a 90-degrees phase shifter 4 for delaying the phase of the reference signal outputted by the oscillator unit 3 by 90 degrees; a multiplier 5 for multiplying a signal outputted by the receiver unit 2 by the reference signal; a multiplier 6 for multiplying the signal outputted by the receiver unit 2 by a signal outputted by the 90-degrees phase shifter 4; a filter 7 for removing harmonic components included in an output of the multiplier 5; a filter 8 for removing harmonic components included in an output of the multiplier 6; a differentiator 9 for differentiating an output of the filter 7; a differentiator 10 for differentiating an output of the filter 8; a multiplier 11 for multiplying an output of the differentiator 9 by an output of the filter 8; a multiplier 12 for multiplying an output of the differentiator 10 by the output of the filter 7; a frequency difference detector unit 13 for receiving outputs of the multiplier 11 and the multiplier 12 to detect a difference in frequency between the reference signal and a carrier of the signal outputted by the receiver unit 2; a reference signal control unit 14 for controlling the frequency of the reference signal outputted by the oscillator unit 3 based on the frequency difference detected by the frequency difference detector unit 13; and a detector unit 15 for receiving outputs of the filter 7 and the filter 8 to detect transmitted data.

The demodulator 1 receives a quadrature amplitude modulated signal at the receiver unit 2. Assume that a signal F received by the receiver unit 2 is given by:

$$F = f_1(t)\cos(2\pi ft) + f_2(t)\sin(2\pi ft)$$

where $f_1(t)$ and $f_2(t)$ are base-band signals and f is the frequency of the carrier.

In the first embodiment, the receiver unit 2 outputs a received signal as it is without converting the received signal into an intermediate frequency signal. In other words, the received signal is outputted from the receiver unit 2.

In the demodulator 1, the signal outputted by the receiver unit 2 (received signal F) is multiplied by the reference signal outputted by the oscillator unit 3 in the multiplier 5. Also, the received signal F is multiplied by a signal at a phase 90 degrees shifted from that of the reference signal (a signal outputted by the 90-degrees phase shifter 4) in the multiplier 6. Here, assume that the reference signal outputted by the oscillator unit 3 is given by:

$$\cos(2\pi(f+\Delta f)t)$$

where $\Delta f$ is a frequency difference. Thus, the multiplier 5 outputs a resultant signal as given by the following equation:

$$(f_1(t)\cos(2\pi ft) + f_2(t)\sin(2\pi ft)) * \cos(2\pi(f+\Delta f)t) =$$

$$\frac{1}{2}(f_1(t)\cos(2\pi\Delta ft) - f_2(t)\sin(2\pi\Delta ft)) +$$

$$\frac{1}{2}(f_1(t)\cos(2\pi(2f+\Delta f)t) + f_2(t)\sin(2\pi(2f+\Delta f)t))$$

Harmonic components included in the signal outputted by the multiplier 5 is removed by the filter 7 to produce a first demodulated signal expressed by the following equation:

$$p(t) = \frac{1}{2}(f_1(t)\cos(2\pi\Delta ft) - f_2(t)\sin(2\pi\Delta ft))$$

Similarly, the multiplier 6 outputs a signal expressed by the following equation:

$$(f_1(t)\cos(2\pi ft) + f_2(t)\sin(2\pi ft)) * \sin(2\pi(f+\Delta f)t) =$$

$$\frac{1}{2}(f_1(t)\sin(2\pi\Delta ft) + f_2(t)\cos(2\pi\Delta ft)) +$$

$$\frac{1}{2}(f_1(t)\sin(2\pi(2f+\Delta f)t) - f_2(t)\cos(2\pi(2f+\Delta f)t))$$

Harmonic components included in the signal outputted by the multiplier 6 are removed by the filter 8 to produce a second demodulated signal q(t) given by:

$$q(t) = \frac{1}{2}(f_1(t)\sin(2\pi\Delta ft) + f_2(t)\cos(2\pi\Delta ft))$$

It will be understood that by reducing the frequency difference $\Delta f$ between the reference signal outputted by the oscillator unit 3 and the carrier to zero, the first and second demodulated signals q(t), p(t) are transformed into the following equations:

$$p(t) = \frac{1}{2}f_1(t)$$

$$q(t) = \frac{1}{2}f_2(t)$$

Thus, if the frequency of the reference signal outputted by the oscillator unit 3 is selected to be identical to that of the carrier of the received signal, base-band signals can be detected.

Now, the processing for controlling the frequency of the reference signal outputted by the oscillator unit 3 will be described. The differentiator 9 receives the first demodulated signal p(t) and outputs a differentiated first demodulated signal dp(t)/dt given by:

$$\frac{dp(t)}{dt} =$$

$$\frac{1}{2}\left(\frac{df_1(t)}{dt}\cos(2\pi\Delta ft) - 2\pi\Delta f * f_1(t)\sin(2\pi\Delta ft) - \frac{df_2(t)}{dt}\sin(2\pi\Delta ft) - 2\pi\Delta f * f_2(t)\cos(2\pi\Delta ft)\right)$$

Also, the differentiator 10 receives the second demodulated signal q(t) and outputs a differentiated second demodulated signal dq(t)/dt given by:

$$\frac{dq(t)}{dt} =$$

$$\frac{1}{2}\left(\frac{df_1(t)}{dt}\sin(2\pi\Delta ft) + 2\pi\Delta f * f_1(t)\cos(2\pi\Delta ft) + \frac{df_2(t)}{dt}\cos(2\pi\Delta ft) - 2\pi\Delta f * f_2(t)\sin(2\pi\Delta ft)\right)$$

The multiplier 11 multiplies q(t) by dp(t)/dt and outputs a resultant signal given by:

$$q(t) * \frac{dp(t)}{dt} = \frac{1}{4}\left[f_1(t) * \frac{df_1(t)}{dt}\cos(2\pi\Delta ft)\sin(2\pi\Delta ft) + \right.$$

$$\frac{df_1(t)}{dt} * f_2(t)\cos^2(2\pi\Delta ft) -$$

$$(2\pi\Delta f)f_1(t)^2\sin^2(2\pi\Delta ft) -$$

$$(2\pi\Delta f)f_1(t)f_2(t)\cos(2\pi\Delta ft)\sin(2\pi\Delta ft) -$$

$$f_1(t) * \frac{df_2(t)}{dt}\sin^2(2\pi\Delta ft) -$$

-continued $$f_2(t) * \frac{df_2(t)}{dt} \cos(2\pi\Delta ft)\sin(2\pi\Delta ft) -$$

$$(2\pi\Delta f)f_1(t)f_2(t)\cos(2\pi\Delta ft)\sin(2\pi\Delta ft) -$$

$$(2\pi\Delta f)f_2(t)^2\cos^2(2\pi\Delta ft)]$$

The multiplier 12 multiplies p(t) by dq(t)/dt and outputs the resultant signal given by:

$$p(t) * \frac{dq(t)}{dt} = \frac{1}{4}\left[ f_1(t) * \frac{df_1(t)}{dt} \cos(2\pi\Delta ft)\sin(2\pi\Delta ft) - \right.$$

$$\frac{df_1(t)}{dt} * f_2(t)\sin^2(2\pi\Delta ft) +$$

$$(2\pi\Delta f)f_1(t)^2\cos^2(2\pi\Delta ft) -$$

$$(2\pi\Delta f)f_1(t)f_2(t)\cos(2\pi\Delta ft)\sin(2\pi\Delta ft) +$$

$$f_1(t) * \frac{df_2(t)}{dt} \cos^2(2\pi\Delta ft) -$$

$$f_2(t) * \frac{df_2(t)}{dt} \cos(2\pi\Delta ft)\sin(2\pi\Delta ft) -$$

$$(2\pi\Delta f)f_1(t)f_2(t)\cos(2\pi\Delta ft)\sin(2\pi\Delta ft) -$$

$$(2\pi\Delta f)f_2(t)^2\sin^2(2\pi\Delta ft)]$$

The outputs of the multipliers 11, 12 are supplied to the frequency difference detector unit 13 which calculates the difference between the two supplied signals, as given by:

$$p(t) * \frac{dq(t)}{dt} - q(t) * \frac{dp(t)}{dt} =$$

$$\frac{1}{4}\left[ \left( \frac{df_1(t)}{dt} * f_2(t) - f_1(t) * \frac{df_2(t)}{dt} \right) + (2\pi\Delta f)*((f_1(t))^2 + (f_2(t))^2) \right]$$

and calculates an average time of the calculation result. Stated another way, the frequency difference detector unit 13 calculates an expected value of the calculation result. Here, the following relationship is satisfied:

$$E\left[ f_1(t) * \frac{df_2(t)}{dt} - \frac{df_1(t)}{dt} * f_2(t) \right] = 0$$

Therefore, the following relationship is satisfied:

$$E\left[ p(t) * \frac{dq(t)}{dt} - q(t) * \frac{dp(t)}{dt} \right] = -2\pi\Delta f * E[(f_1(t))^2 + (f_2(t))^2]$$

Thus, by calculating a time average of the calculation result made by the frequency difference detector unit 13, a value proportional to the frequency difference Δf can be calculated. The reference signal control unit 14 controls the frequency of the reference signal outputted by the oscillator unit 3 based on this result. Consequently, this enables the oscillator unit 3 to output a signal at the same frequency as that of the carrier of the signal outputted by the receiver unit 2.

With the reference signal having the same frequency as that of the carrier, outputted by the oscillator unit 3, the first and second demodulated signals are given by:

$$p(t) = \frac{1}{2}f_1(t)$$

$$q(t) = \frac{1}{2}f_2(t)$$

and, the detector unit 15 can detect transmitted data from the first and second demodulated signals including the base-band signals.

Figure 3:
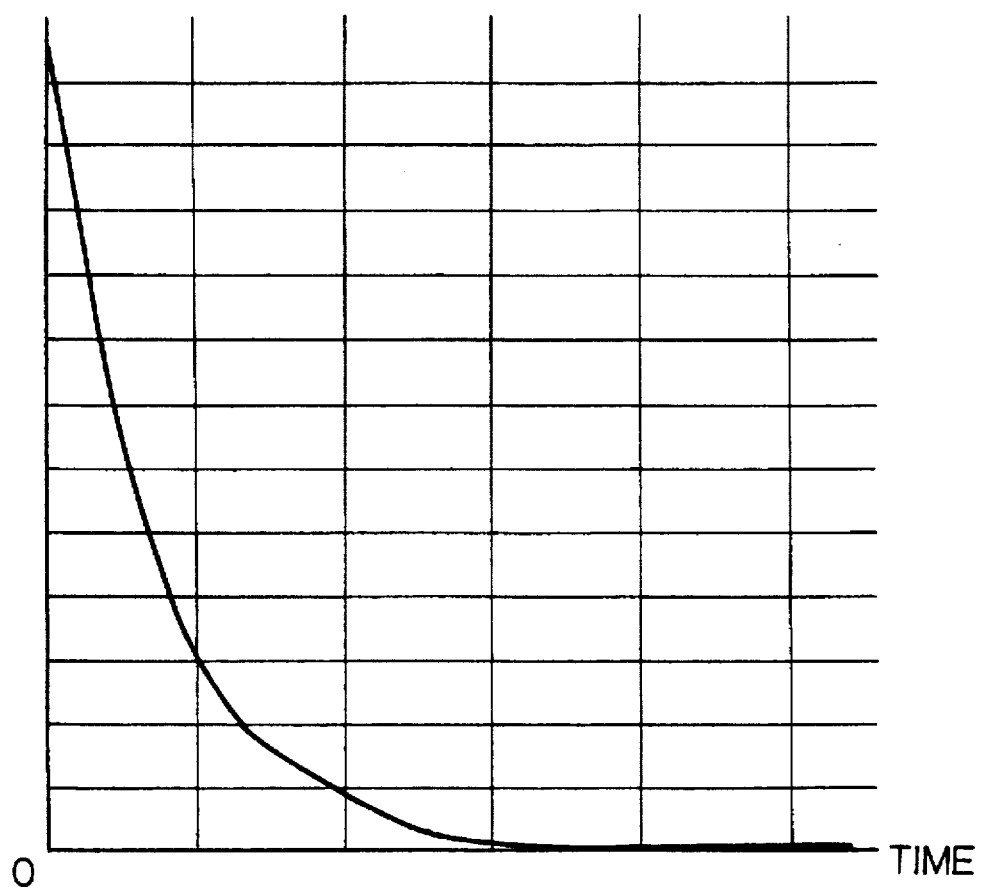
FIG. 3 is a graph illustrating the result of a simulation of a frequency control in the demodulator shown in FIG. 2.

FIG. 3 illustrates the result of a simulation in which the frequency of the reference signal outputted by the oscillator unit 3 is controlled as described above. In the graph illustrated in FIG. 3, the ordinate represents the difference in frequency between the reference signal and the received signal, and the abscissa represents the time. As is apparent from FIG. 3, the frequency of the reference signal outputted by the oscillator unit 3 is coincident with the frequency of the carrier of the received signal. It will be understood that the transmitter side need not output signal to be transmitted with a carrier component included therein. Stated another way, since the transmitter side does not transmit the carrier component, the efficiency of data transmission can be improved to 100%.

Figure 4:
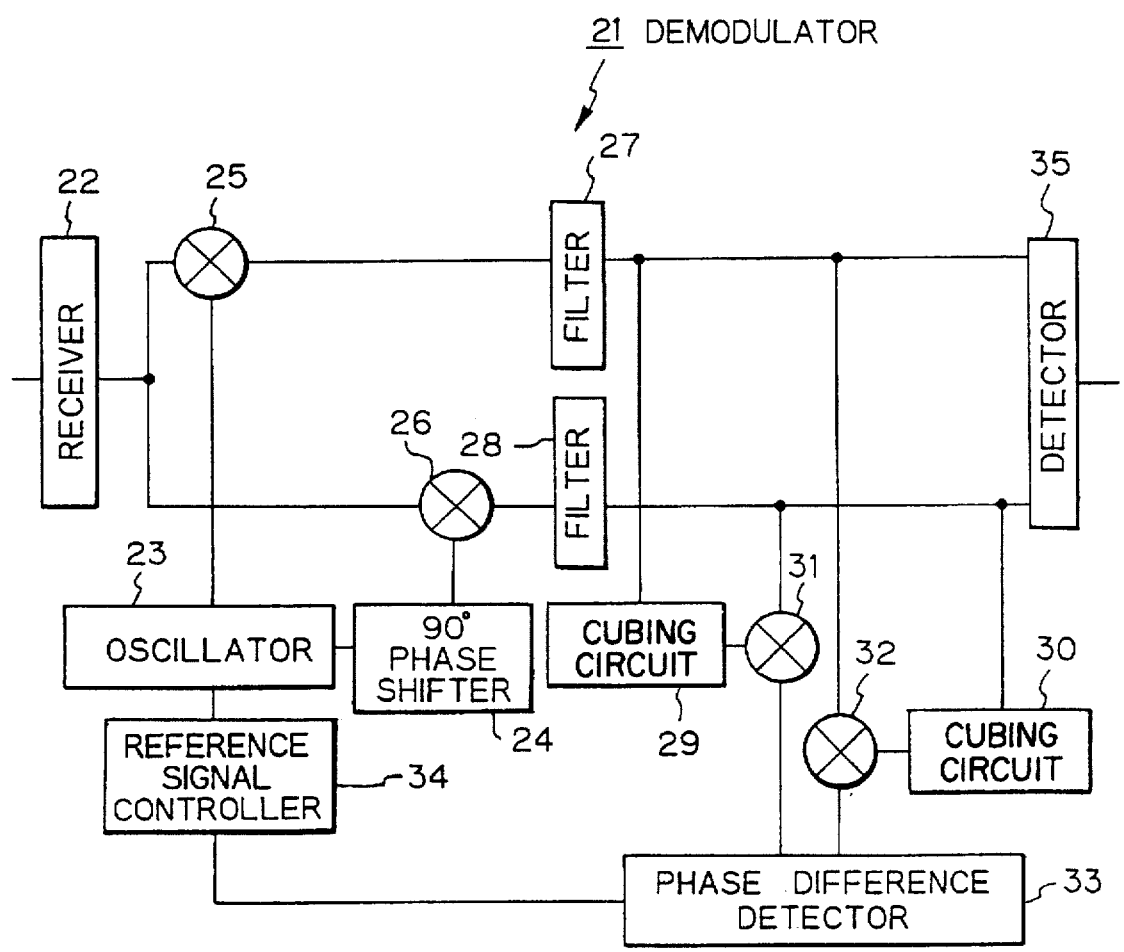
FIG. 4 is a block diagram illustrating the configuration of a QAM demodulator according to a second embodiment of the present invention.

FIG. 4 illustrates the configuration of a QAM demodulator according to a second embodiment of the present invention. A demodulator 21 comprises a receiver unit 22 for receiving and outputting a quadrature amplitude modulated signal; an oscillator unit 23 for generating a reference signal; a 90-degrees phase shifter 24 for delaying the phase of the reference signal outputted by the oscillator unit 23 by 90 degrees; a multiplier 25 for multiplying a signal outputted by the receiver unit 22 by the reference signal; a multiplier 26 for multiplying the signal outputted by the receiver unit 22 by a signal outputted by the 90-degrees phase shifter 24; a filter 27 for removing harmonic components included in an output of the multiplier 25; a filter 28 for removing harmonic components included in an output of the multiplier 26; a cubing circuit 29 for cubing an output of the filter 27; a cubing circuit 30 for cubing an output of the filter 28; a multiplier 31 for multiplying an output of the cubing circuit 29 by the output of the filter 28; a multiplier 32 for multiplying an output of the cubing circuit 30 by the output of the filter 27; a phase difference detector unit 33 for receiving outputs of the multipliers 31, 32 to detect a phase difference between the reference signal and the carrier of the signal outputted by the receiver unit 22; a reference signal control unit 34 for controlling the phase of the reference signal outputted by the oscillator unit 23 based on the phase difference detected by the phase difference detector unit 33; and a detector unit 35 for receiving outputs of the filters 27, 28 to detect base-band signals.

The demodulator 21 receives a quadrature amplitude modulated signal at the receiver unit 22. Assume that a signal F received by the receiver unit 22 is given by:

$$F = f_1(t)\cos(2\pi ft) + f_2(t)\sin(2\pi ft)$$

where $f_1(t)$ and $f_2(t)$ are base-band signals and f is the frequency of the carrier.

Also in the second embodiment, the receiver unit 22 outputs a received signal as it is without converting the received signal into an intermediate frequency signal. In other words, the received signal is outputted from the receiver unit 22.

In the demodulator 21, the signal outputted by the receiver unit 22 (received signal F) is multiplied by the reference signal outputted by the oscillator unit 23 in the multiplier 25. Also, the received signal F is multiplied by a signal at a phase 90 degrees shifted from that of the reference signal (a signal outputted by the 90-degrees phase shifter 24) in the multiplier 26. Assume here that the reference signal outputted by the oscillator unit 23 is given by:

$$\cos(2\pi(f+\Delta f)t+\phi(t))$$

where Δf is a frequency difference, and φ(t) is a phase difference.

Thus, the multiplier 25 outputs a resultant signal as expressed by the following equation:

$$[f_1(t)\cos(2\pi ft)+f_2(t)\sin(2\pi ft)]*\cos(2\pi(f+\Delta f)t+\phi(t))]+\frac{1}{2}$$
$$[f_1(t)\cos(2\pi(2f+\Delta f)t)+f_2(t)\sin(2\pi(2f+\Delta f)t)]$$

Harmonic components included in the signal outputted by the multiplier 25 is removed by the filter 27 to produce a first demodulated signal given by:

$$p(t)=\frac{1}{2}[f_1(t)\cos(2\pi\Delta ft+\phi(t))-f_2(t)\sin(2\pi\Delta ft+\phi(t))]$$

Similarly, the multiplier 26 outputs a signal given by:

$$[f_1(t)\cos(2\pi ft)+f_2(t)\sin(2\pi ft)]*\sin(2\pi(f+\Delta f)t+\phi P(t))=$$

$$\frac{1}{2}[f_1(t)\sin(2\pi\Delta ft+\phi(t))+f_2(t)\cos(2\pi\Delta ft+\phi(t))]+$$

$$\frac{1}{2}[f_1(t)\sin(2\pi(2f+\Delta f)t)-f_2(t)\cos(2\pi(2f+\Delta f)t)]$$

Harmonic components included in the signal outputted by the multiplier 26 are removed by the filter 28 to produce a second demodulated signal q(t) given by:

$$q(t)=\frac{1}{2}[f_1(t)\sin(2\pi\Delta ft+\phi(t))+f_2(t)\cos(2\pi\Delta ft+\phi(t))]$$

Accordingly, by fixing the phase difference between the reference signal outputted by the oscillator 23 and the carrier at either one of 0 degree, 90 degrees, 180 degrees, and 270 degrees (the reference signal and the carrier are coincident in frequency), the first and second demodulated signals q(t), p(t) are transformed into the following equations:

$$p(t)=\frac{1}{2}f_1(t)$$

$$q(t)=\frac{1}{2}f_2(t)$$

with the phase difference fixed at 0 degree;

$$p(t)=-\frac{1}{2}f_2(t)$$

$$q(t)=\frac{1}{2}f_1(t)$$

with the phase difference fixed at 90 degrees;

$$p(t)=-\frac{1}{2}f_1(t)$$

$$q(t)=-\frac{1}{2}f_2(t)$$

with the phase difference fixed at 180 degrees; and $$p(t)=\frac{1}{2}f_2(t)$$

$$q(t)=-\frac{1}{2}f_1(t)$$

with the phase difference fixed at 270 degrees.

It can be seen from the foregoing that the base-band signals can be detected in either of the cases.

Next, the processing for controlling the phase of the reference signal outputted by the oscillator unit 23 will be described. The cubing circuit 29 receives the first demodulated signal p(t) and outputs a cube of the first demodulated signal $p^3(t)$. Also, the cubing circuit 30 receives the second demodulated signal q(t) and outputs a cube of the second demodulated signal $q^3(t)$. The multiplier 31 calculates $p^3(t) \times q(t)$, while the multiplier 32 calculates $q^3(t) \times p(t)$.

Outputs of the multipliers 29, 30 are supplied to the phase difference detector unit 33 which performs a calculation, described below, and controls the frequency and the phase of the reference signal outputted by the oscillator unit 23 based on the calculation result.

Specifically, the phase difference detector unit 33 performs the following calculation:

$$[p(t)]^3*q(t)-[q(t)]^{3t}*p(t)$$

The result of the calculation being zero means that the frequency of the carrier is coincident with that of the reference signal and the phase difference therebetween is at either of 0 degree, 90 degrees, 180 degrees, and 270 degrees. The reference signal control unit 34 receives the result of the calculation performed by the phase difference detector unit 33 and controls the frequency and the phase of the reference signal outputted by the oscillator unit 23. This control enables the oscillator unit 23 to generate the reference signal having the same frequency as the carrier and a phase difference of 0 degree, 90 degrees, 180 degrees or 270 degrees with the carrier. Thus, the base-band signals can be detected as mentioned above.

The demodulator 21 performs coding processing on these base-band signals to detect transmitted data in the detector unit 25.

Figure 5:
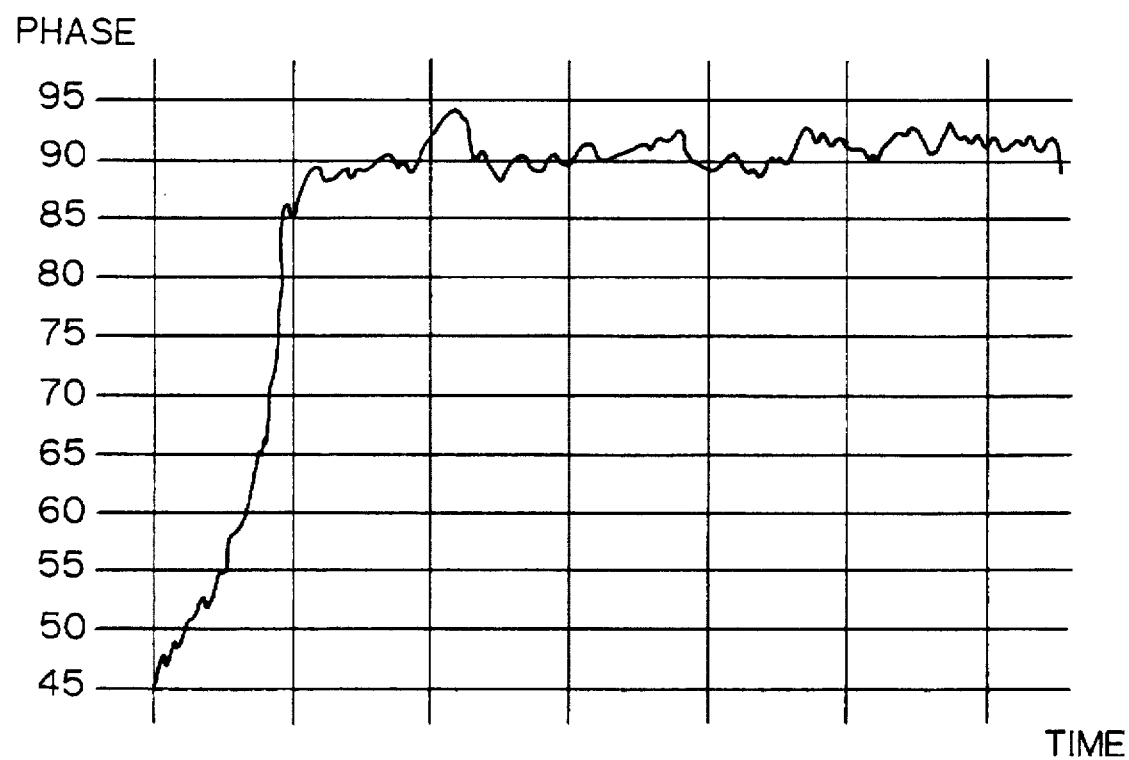
FIG. 5 is a graph illustrating the result of a simulation of a phase control in the demodulator shown in FIG. 4.

FIG. 5 illustrates the result of a simulation in which the phase of the reference signal outputted by the oscillator unit 23 is controlled in the foregoing manner. In this simulation, a signal having substantially the same frequency as the carrier and a phase difference of 45 degrees is initially generated as the reference signal. In FIG. 5, the ordinate represents the phase difference between the reference signal and the carrier of the received signal, and the abscissa represents the time. It can be seen from FIG. 5 that the phase difference between the reference signal outputted by the oscillator 23 and the carrier of the received signal converges to 90 degrees. Thus, the transmitter side need not output a signal to be transmitted with a carrier component included therein. This results in improving the efficiency of data transmission to 100% because the carrier component is not transmitted from the transmitter side.

Figure 6:
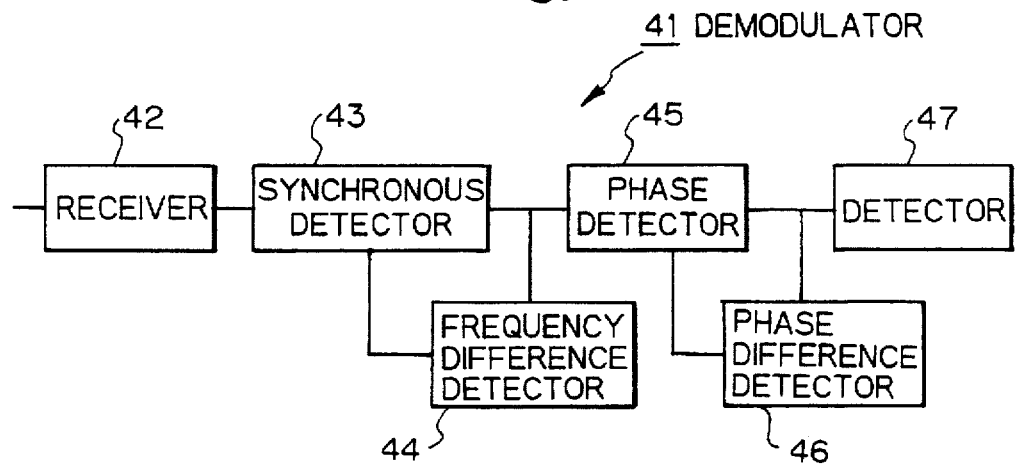
FIG. 6 is a block diagram illustrating a QAM demodulator according to a third embodiment of the present invention.

FIG. 6 is a block diagram illustrating the configuration of a QAM demodulator according to a third embodiment of the present invention. A demodulator 41 comprises a receiver unit 42 for extracting an intermediate frequency of a particular signal from signals on a wired coaxial cable on which the signals are multiplexed, and outputting the extracted signal and a signal at a phase 90 degrees shifted from the phase of the extracted signal; a synchronous detector unit 43 for performing synchronous detection on the two different signals outputted by the receiver unit 42; a frequency difference detector unit 44 for detecting a frequency difference in the synchronous detection from an output of the synchronous detector unit 43; a phase detector unit 45 for detecting the phase of the output from the synchronous detector unit 43; a phase difference detector unit 46 for detecting a phase difference in the phase detection from an output of the phase detector unit 45 to control the phase detector unit 45; and a detector unit 47 for equalizing a phase detected signal in the phase detector unit 45 to detect transmitted data.

Figure 7:
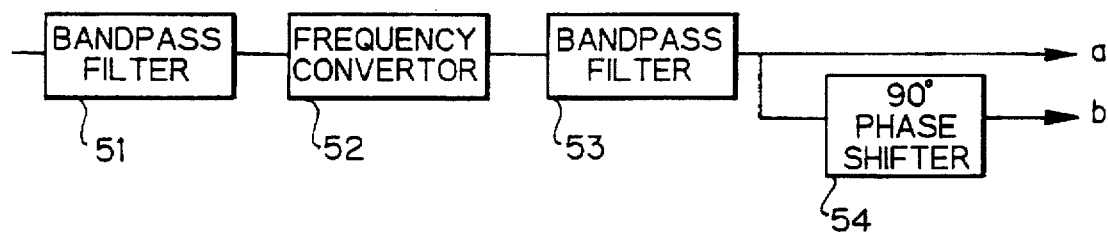
FIG. 7 is a block diagram illustrating the configuration of a receiver unit in FIG. 6.

FIG. 7 illustrates the configuration of the receiver unit 42 in FIG. 6. The receiver unit 42 comprises a bandpass filter 51 for passing signals within a predetermined pass band from multiplexed signals transmitted through the wired coaxial cable; a frequency convertor unit 52 for converting the frequency of a signal passing through the bandpass filter 51; a bandpass filter 53 for only passing a particular frequency signal therethrough from the signal converted by the frequency convertor unit 52; and a 90-degrees phase shifter 54 for outputting the signal passing through the bandpass filter 53 and a signal at a phase 90 degrees shifted from the phase of this signal.

Figure 8:
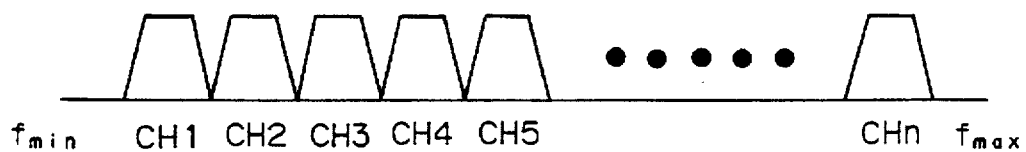
FIG. 8 is a diagram illustrating an example of a signal assignment on a wired coaxial cable in the third embodiment.
Figure 9:
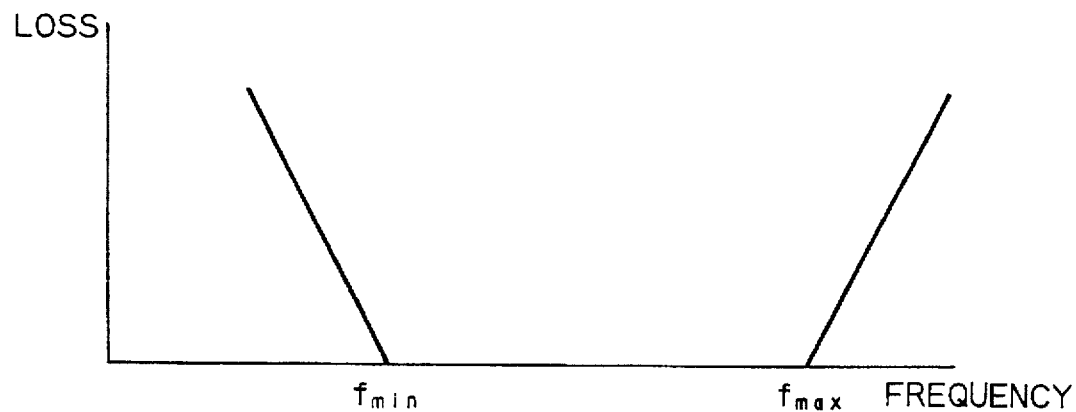
FIG. 9 is a graph illustrating the characteristic of a bandpass filter in FIG. 7.
Figure 10:
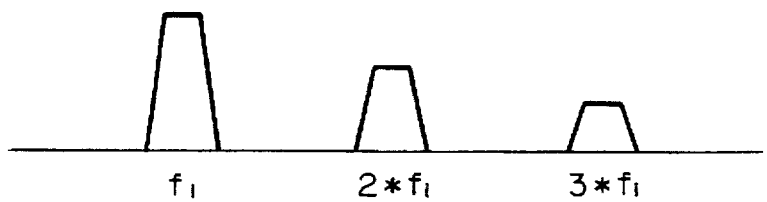
FIG. 10 is a diagram illustrating an example of a signal assignment after a frequency conversion has been performed.
Figure 11:
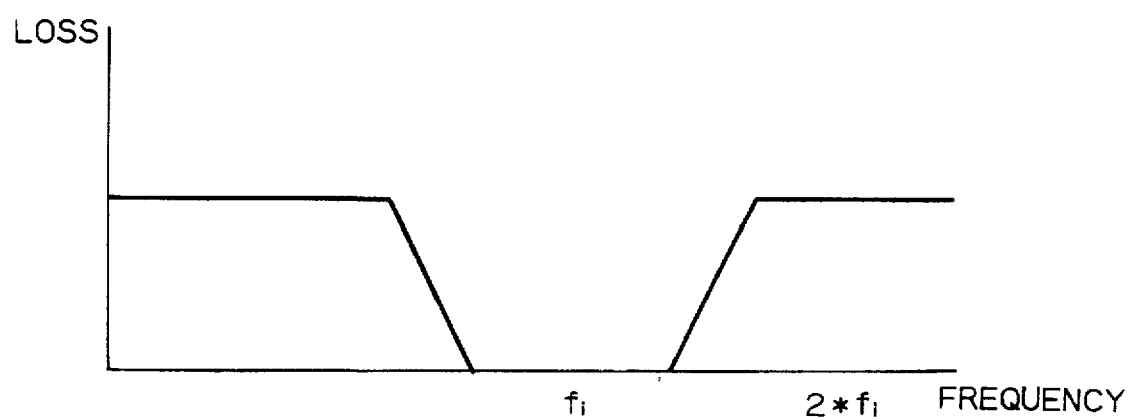
FIG. 11 is a graph illustrating the characteristic of a bandpass filter in FIG. 7.

On the wired coaxial cable, signals on respective channels are multiplexed as illustrated in FIG. 8. The characteristic of the bandpass filter 51 is illustrated in FIG. 9. The bandpass filter 51 passes therethrough signals on all channels on the wired coaxial cable. The frequency convertor unit 52 converts the frequencies of the signals passing through the bandpass filter 51 to extract intermediate frequency signals. An example of a signal assignment after the frequency conversion has been performed is illustrated in FIG. 10. Harmonic components generated by the frequency conversion are removed by the bandpass filter 53, so that an intermediate frequency signal on a particular channel can only be extracted. The characteristic of the bandpass filter 53 is illustrated in FIG. 11. The 90-degrees phase shifter 54 receives the extracted intermediate frequency signal and outputs a signal at a phase 90 degrees shifted from the phase of this intermediate frequency signal.

The receiver unit 42 performs the foregoing operations to extract an intermediate frequency signal on a particular channel from the signals multiplexed on the wired coaxial cable, and to output this extracted signal a and a signal b at a phase 90 degrees shifted from the phase of this signal a. It should be noted that while in the foregoing description the receiver unit 42 receives a signal on a wired coaxial cable, the receiver unit 42 may receive a radio signal or the like.

Here, the two different signals a, b outputted by the receiver unit 42 are given by:

$$a = f_1(t)\cos(2\pi ft) + f_2(t)\sin(2\pi ft)$$

$$b = f_1(t)\sin(2\pi ft) - f_2(t)\cos(2\pi ft)$$

Figure 12:
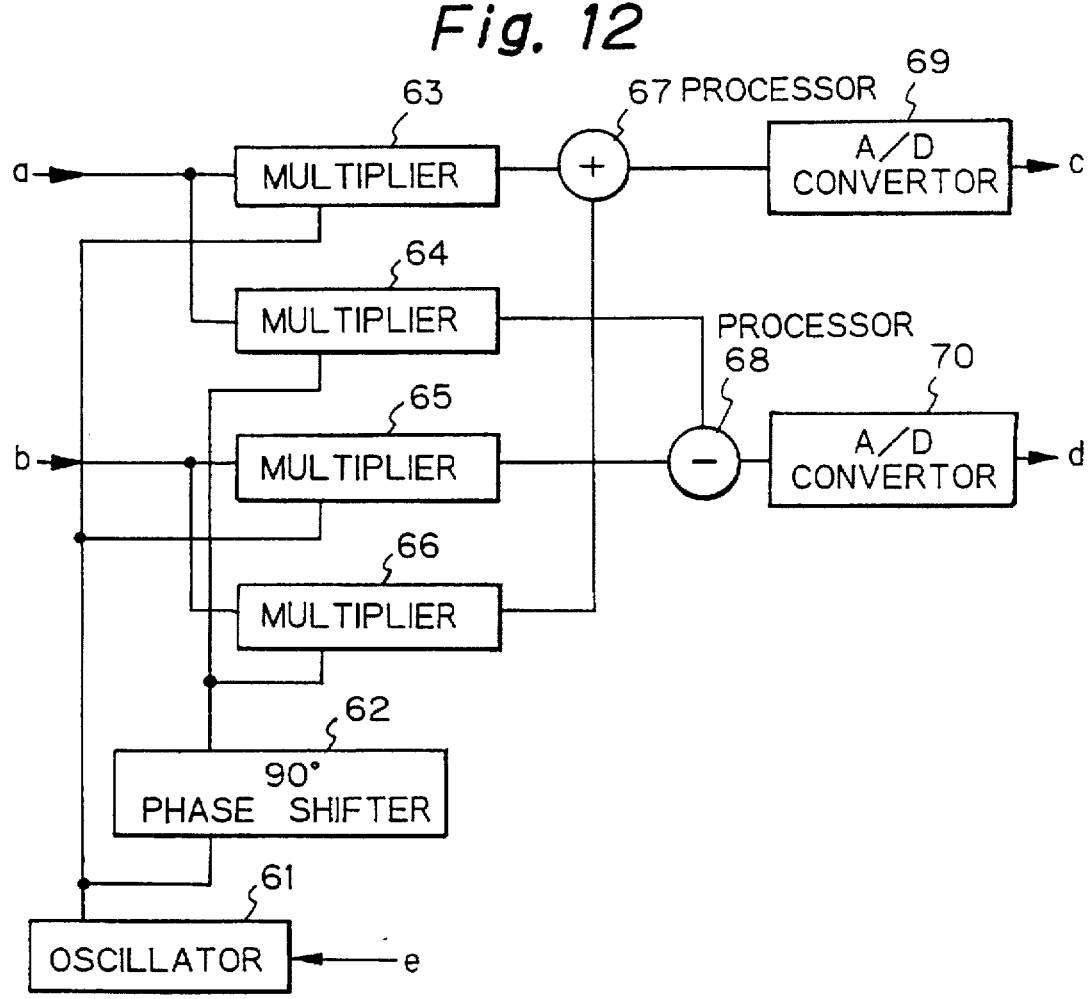
FIG. 12 is a block diagram illustrating the configuration of a synchronous detector unit in FIG. 6.

FIG. 12 is a block diagram illustrating the configuration of the synchronous detector unit 43 in FIG. 6. The synchronous detector unit 43 comprises an oscillator unit 61 for outputting a reference signal; a 90-degrees phase shifter 62 for receiving the reference signal outputted by the oscillator 61 and outputting a signal at a phase 90 degrees shifted from the phase of the reference signal; a multiplier 63 for multiplying the reference signal by the signal a; a multiplier 65 for multiplying the reference signal by the signal b; multipliers 64 and 66 for multiplying the signal at a phase 90 degrees shifted from the phase of the reference signal by the signal a and b, respectively; a processing unit 67 for receiving outputs of the multipliers 63, 66 to perform a predetermined calculation; a processing unit 68 for receiving outputs of the multipliers 64, 65 to perform a predetermined calculation; an A/D convertor 69 for converting an output of the processing unit 67 into a digital form; and an A/D convertor 70 for converting an output of the processing unit 68 into a digital form.

The synchronous detector unit 43 performs the following processing using the signals a, b outputted by the receiver unit 42. The oscillator unit 61 outputs a signal given by the following formula as the reference signal:

$$\cos(2\pi(f+\Delta f)t + \phi(t))$$

where $\Delta f$ is a frequency difference, and $\phi(t)$ is a phase difference. The oscillator unit 61 is fed with a control signal e, such that the oscillator unit 61 changes the frequency of the reference signal to be outputted based on the fed control signal e. The control signal e will be later described.

Signals outputted by the multipliers 63–66 are respectively given by the following equations:

Multiplier 63:

$$[f_1(t)\cos(2\pi ft) + f_2(t)\sin(2\pi ft)]*\cos(2\pi(f+\Delta f)t + \phi(t)) =$$

$$\frac{1}{2}[f_1(t)\cos(2\pi\Delta ft + \phi(t)) - f_2(t)\sin(2\pi\Delta ft) + \phi(t)] +$$

$$\frac{1}{2}[f_1(t)\cos(2\pi(2f+\Delta f)t + \phi(t)) +$$

$$f_2(t)\sin(2\pi(2f+\Delta f)t + \phi(t))]$$

Multiplier 64:

$$[f_1(t)\cos(2\pi ft) + f_2(t)\sin(2\pi ft)]*\sin(2\pi(f+\Delta f)t + \phi(t)) =$$

$$\frac{1}{2}[f_1(t)\sin(2\pi\Delta ft + \phi(t)) + f_2(t)\cos(2\pi\Delta ft) + \phi(t)] +$$

$$\frac{1}{2}[f_1(t)\sin(2\pi(2f+\Delta f)t + \phi(t)) +$$

$$f_2(t)\cos(2\pi(2f+\Delta f)t + \phi(t))]$$

Multiplier 65:

$$[f_1(t)\sin(2\pi ft) - f_2(t)\cos(2\pi ft)]*\cos(2\pi(f+\Delta f)t + \phi(t)) =$$

$$\frac{1}{2}[f_1(t)\sin(2\pi\Delta ft + \phi(t)) - f_2(t)\cos(2\pi\Delta ft) + \phi(t)] +$$

$$\frac{1}{2}[f_1(t)\sin(2\pi(2f+\Delta f)t + \phi(t)) -$$

$$f_2(t)\cos(2\pi(2f+\Delta f)t + \phi(t))]$$

Multiplier 66:

$$[f_1(t)\sin(2\pi ft) - f_2(t)\cos(2\pi ft)]*\sin(2\pi(f+\Delta f)t + \phi(t)) =$$

$$\frac{1}{2}[f_1(t)\cos(2\pi\Delta ft + \phi(t)) - f_2(t)\sin(2\pi\Delta ft) + \phi(t)] +$$

$$\frac{1}{2}[-f_1(t)\cos(2\pi(2f+\Delta f)t + \phi(t)) -$$

$$f_2(t)\sin(2\pi(2f+\Delta f)t + \phi(t))]$$

The processing unit 67 receives the outputs of the multipliers 63, 66 to perform a calculation. Specifically, this calculation is addition of the outputs of the multiplier 63 and the output of the multiplier 66. Therefore, the processing unit 67 outputs a signal p(t) given by:

$$p(t) = f_1(t)\cos(2\pi\Delta ft + \phi(t)) - f_2(t)\sin(2\pi\Delta ft + \phi(t))$$

The processing unit 68 in turn receives the outputs of the multipliers 64, 65 to perform a calculation. Specifically, this calculation is subtraction of the output of the multiplier 65 from the output of the multiplier 64. Therefore, the processing unit 68 outputs a signal q(t) given by:

$$q(t) = f_1(t)\sin(2\pi\Delta ft + \phi(t)) + f_2(t)\cos(2\pi\Delta ft + \phi(t))$$

The A/D convertors 69, 70 output signals c, d which are digitally converted versions of the signals outputted by the processing units 67, 68, respectively.

Thus, by controlling the oscillator unit 61 to output a signal at the same frequency as that of the intermediate frequency signal, which is frequency-converted from the received signal, the signals c, d outputted by the A/D convertors 69, 70 are given by:

$$c = f_1(t)\cos(\phi(t)) - f_2(t)\sin(\phi(t))$$

$$d = f_1(t)\sin(\phi(t)) + f_2(t)\cos(\phi(t))$$

Figure 13:
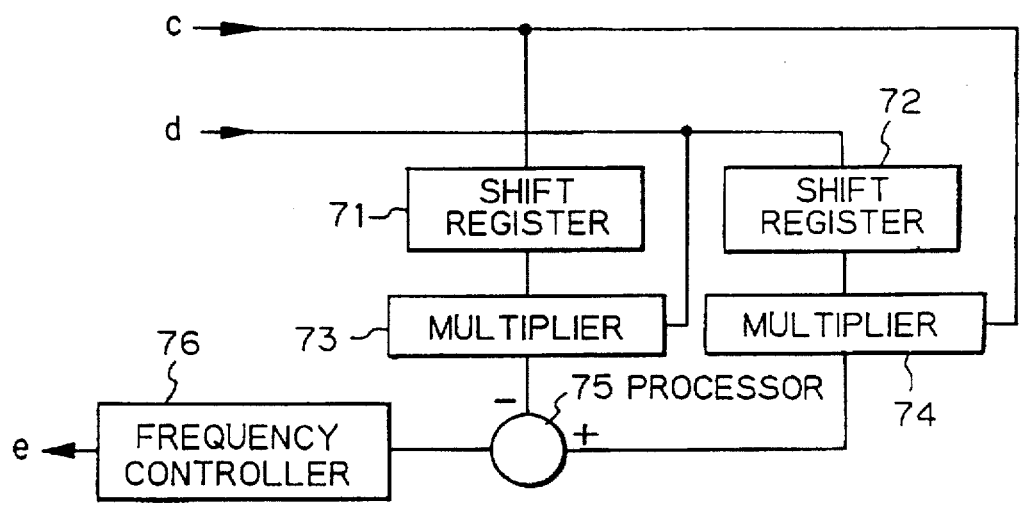
FIG. 13 is a block diagram illustrating the configuration of a frequency difference detector unit in FIG. 6.

Now, processing for controlling the oscillator unit 61 to output the reference signal at the same frequency as that of the carrier of the intermediate frequency signal will be described with in connection with the configuration and operations of the frequency difference detector unit 44 in FIG. 6. FIG. 13 is a block diagram illustrating the configuration of the frequency difference detector unit 44. The frequency difference detector unit 44 comprises shift registers 71, 72 for receiving the digital output signals c, d outputted by the A/D convertors 69, 70, respectively; a multiplier circuit 73 for multiplying an output of the shift register 71 by the signal d outputted by the A/D convertor 70; a multiplier circuit 74 for multiplying an output of the shift register 72 by the signal c outputted by the A/D convertor 69; a processing unit 75 for receiving outputs of the multipliers 73, 74 and performing a predetermined calculation to output a variate proportional to a frequency difference between the outputs of the multipliers 73, 74; and a frequency control unit 76 for receiving an output of the processing unit 75 to output the control signal e for controlling the frequency of the reference signal outputted by the oscillator unit 61 in the synchronous detector 43.

The frequency difference detector unit 44 receives the signals c, d outputted by the A/D convertors 69, 70 at the shift registers 71, 72. The shift registers 71, 72, when receiving the signals c, d outputted by the A/D convertors 69, 70, output the respective received signals after a sampling time T of the A/D convertors 69, 70 has elapsed. In other words, the shift registers 71, 72 output signals given by the following formulae:

Shift Register 69:

$$p(t-T)$$

Shift Register 70:

$$q(t-T)$$

where T is the sampling time of the A/D convertors.

The multiplier circuit 73 receives the signal c outputted by the A/D convertor 69 and the signal outputted by the shift register 72 to multiply these signals. The multiplier 74 in turn receives the signal d outputted by the A/D convertor 70 and the output of the shift register 71 to multiply these signals. Thus, the multiplier circuits 73, 74 output signals expressed by the following formulae:

Multiplier 73:

$$p(t-T)*q(t)$$

Multiplier 74:

$$p(t)*q(t-T)$$

Then, the processing unit 75 performs the following calculation:

$$p(t-T)*q(t)-p(t)*q(t-T)$$

The frequency control unit 76 calculates a time average of the signal outputted by the processing unit 75, and outputs the frequency control signal e for controlling the frequency of the reference signal outputted by the oscillator 61 based on the calculated value.

As described above in connection with the first embodiment, the result of the following calculation is proportional to a frequency difference:

$$p(t)*\frac{dq(t)}{dt} - q(t)*\frac{dp(t)}{dt}$$

This is equal to taking a time average of the following formula:

$$E\left[ p(t)*\left[ \frac{q(t)-q(t-T)}{T} \right] - \left[ \frac{p(t)-p(t-T)}{T} \right]*q(t) \right]$$

Expanding this formula results in:

$$E[p(t-T)*q(t)-p(t)*q(t-T)]$$

It can be understood from the foregoing that the variate proportional to a frequency difference can be detected by taking a tame average of the signal outputted by the processing unit 75. The frequency control unit 76, therefore, can control the frequency of the reference signal outputted by the oscillator unit 61 based on the variate proportional to the frequency difference.

As described above, the synchronous detector unit 42 can accurately perform the synchronous detection by controlling the frequency of the reference signal outputted by the oscillator unit 61.

Figure 14:
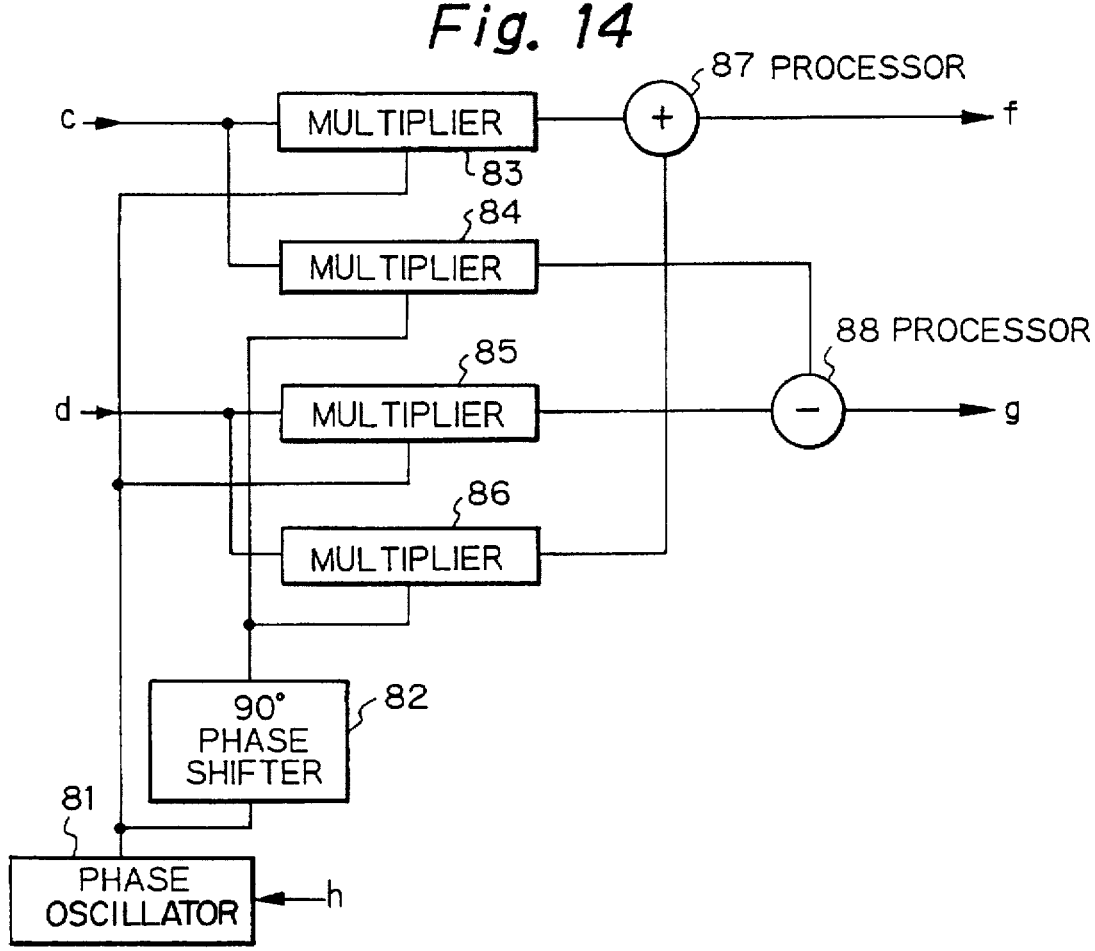
FIG. 14 is a block diagram illustrating the configuration of a phase detector unit in FIG. 6.

The thus synchronous detected signals c, d are sent to the phase detector unit 45. FIG. 14 is a block diagram illustrating the configuration of the phase detector unit 45. The phase detector unit 45 comprises a phase oscillator 81; a 90-degrees phase shifter 82 for receiving an output of the phase oscillator 81 to output a signal at a phase 90 degrees shifted from the phase of the received signal; a multiplier circuit 83 for multiplying the signal c outputted by the A/D convertor 69 by the output of the phase oscillator 81; a multiplier circuit 84 for multiplying the signal c outputted by the A/D convertor 69 by an output of the 90 degrees phase shifter 82; a multiplier circuit 85 for multiplying the signal d outputted by the A/D convertor 70 by the output of the phase oscillator 81; a multiplier circuit 86 for multiplying the signal d outputted by the A/D convertor 70 by the output of the 90-degrees phase shifter 82; a processing unit 87 for receiving outputs of the multipliers 83, 86 to perform a predetermined calculation; and a processing unit 88 for receiving outputs of the multipliers 84, 85 to perform a predetermined calculation.

The foregoing processing causes the A/D convertors 69, 70 to output the signal c, d as expressed below:

$$c = f_1(t)\cos(\phi(t)) - f_2(t)\sin(\phi(t))$$

$$d = f_1(t)\sin(\phi(t)) + f_2(t)\cos(\phi(t))$$

The phase oscillator 81 outputs a signal given by:

$$\cos(\phi(t)+\Delta\phi(t))$$

The phase oscillator 81 is fed with a control signal h, such that the phase oscillator 81 changes the phase of the reference signal to be outputted based on the fed control signal h. The control signal h will be described later. Signals outputted from the multiplier circuits 83–86 are expressed by the following formulae:

Multiplier Circuit 83:

$$[f_1(t)\cos(\phi(t)) - f_2(t)\sin(\phi(t))]*\cos(\phi(t) + \Delta\phi(t)) =$$

$$\frac{1}{2}[f_1(t)\cos(\Delta\phi(t)) + f_2(t)\sin(\Delta\phi(t))] +$$

-continued $$\frac{1}{2} [f_1(t)\cos(2*\phi(t) + \Delta\phi(t)) - f_2(t)\sin(2*\phi(t) + \Delta\phi(t))]$$

Multiplier Circuit 84:

$[f_1(t)\cos(\phi(t)) - f_2(t)\sin(\phi(t))]*\sin(\phi(t) + \Delta\phi(t)) =$ $$\frac{1}{2} [f_1(t)\sin(\Delta\phi(t)) - f_2(t)\cos(\Delta\phi(t))] +$$

$$\frac{1}{2} [f_1(t)\sin(2*\phi(t) + \Delta\phi(t)) + f_2(t)\cos(2*\phi(t) + \Delta\phi(t))]$$

Multiplier Circuit 85:

$[f_1(t)\sin(\phi(t)) + f_2(t)\cos(\phi(t))]*\cos(\phi(t) + \Delta\phi(t)) =$ $$\frac{1}{2} [-f_1(t)\sin(\Delta\phi(t)) + f_2(t)\cos(\Delta\phi(t))] +$$

$$\frac{1}{2} [f_1(t)\sin(2*\phi(t) + \Delta\phi(t)) + f_2(t)\cos(2*\phi(t) + \Delta\phi(t))]$$

Multiplier Circuit 86:

$[f_1(t)\sin(\phi(t)) + f_2(t)\cos(\phi(t))]*\sin(\phi(t) + \Delta\phi(t)) =$ $$\frac{1}{2} [f_1(t)\cos(\Delta\phi(t)) + f_2(t)\sin(\Delta\phi(t))] +$$

$$\frac{1}{2} [f_1(t)\cos(2*\phi(t) + \Delta\phi(t)) - f_2(t)\sin(2*\phi(t) + \Delta\phi(t))]$$

The processing unit 87 receives the outputs of the multiplier circuits 83, 86 to perform a calculation. Specifically, this calculation is addition of the output of the multiplier circuit 83 and the output of the multiplier circuit 86. Therefore, the processing unit 87 outputs a signal f given by:

$$f = f_1(t)\cos(\Delta\phi(t)) - f_2(t)\sin(\Delta\phi(t))$$

The processing unit 88 in turn receives the outputs of multiplier circuits 84, 85 to perform a calculation. Specifically, this calculation is subtraction of the output of the multiplier circuit 85 from the output of the multiplier circuit 84. Therefore, the processing unit 88 outputs a signal g given by:

$$g = f_1(t)\sin(\Delta\phi(t)) + f_2(t)\cos(\Delta\phi(t))$$

Figure 15:
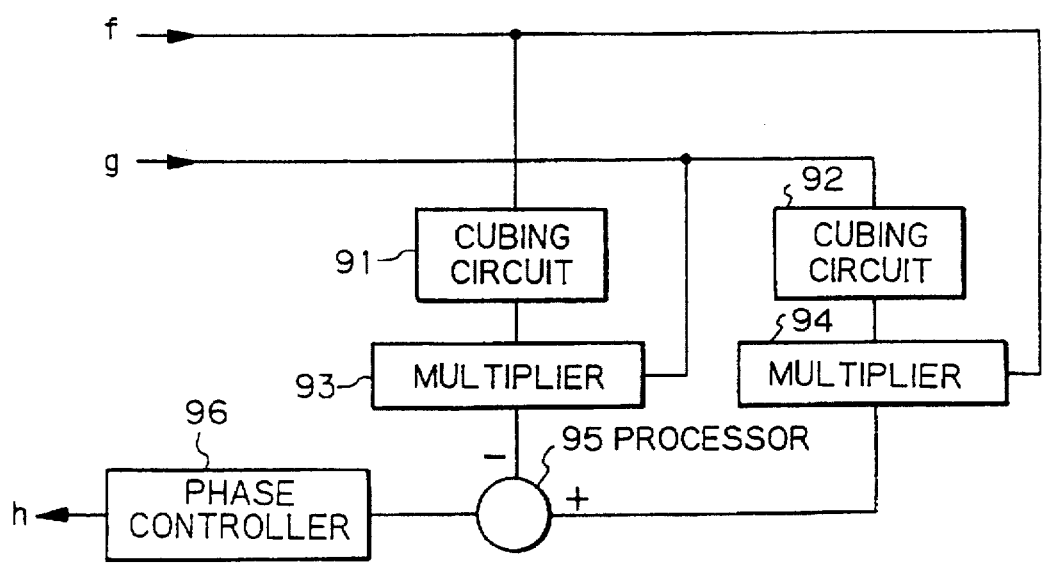
FIG. 15 is a block diagram illustrating the configuration of a phase difference detector unit in FIG. 6.

FIG. 15 is a block diagram illustrating the configuration of the phase difference detector unit 46 in FIG. 6. The phase difference detector unit 46 comprises a cubing circuit 91 for cubing the signal outputted by the processing unit 87; a cubing circuit 92 for cubing the signal outputted by the processing unit 88; a multiplier circuit 93 for multiplying an output of the cubing circuit 91 by the output of the processing unit 88; a multiplier circuit 94 for multiplying an output of the cubing circuit 92 by the output of the processing unit 87; a processing unit 95 for receiving outputs of the multiplier circuits 93, 94, performing a predetermined calculation to detect a phase difference, and outputting the detected phase difference; and a phase control unit 96 for controlling the phase of a signal outputted by the phase oscillator 81 based on the output of the processing unit 95.

In the phase difference detector unit 46, the cubing circuit 91 receives the signal f outputted by the processing unit 87 and outputs a cube of the signal f, i.e., $f^3$. The cubing circuit 92 in turn receives the signal g outputted by the processing unit 88 and outputs a cube of the signal g, i.e., $g^3$. The multiplier circuit 93 outputs a signal given by $f^3 \times g$. The multiplier circuit 94 outputs a signal given by $g^3 \times f$. The processing unit 95 receives outputs of the multiplier circuits 93, 94, performs a calculation given by $f^3*g - f*g^3$, and outputs the calculation result.

As described above in connection with the second embodiment, this calculation result is zero when the phase difference is at 0 degree, 90 degrees, 180 degrees, or 270 degrees.

The phase control unit 96 outputs the phase control signal h so as to reduce the phase difference outputted by the processing unit 95 to zero. This signal h is inputted to the phase oscillator 81, as described above, such that the phase oscillator 81 controls the phase of the signal to be outputted based on this signal h. Thus, the signals f, g outputted from the processing units 87, 88, when the phase difference is at 0 degree, are given by:

$$f = f_1(t)$$

$$g = f_2(t)$$

In other words, the base-band signals are outputted from the processing units 87, 88.

The detector unit 47 receives the base-band signals, detects transmitted data using an equalizer or the like, and outputs the transmitted data.

As described above, since the demodulator is designed to generate the reference signal at the same frequency as that of a carrier of a signal to be demodulated, and to remove the influence of a phase difference included in a demodulated signal, high speed data transmission can be achieved. Also, the transmitter side need not output a signal with a pilot signal included therein. Since the power carried by the pilot signal is suppressed to zero, the efficiency of the data communication can be improved to 100%.

It should be noted that while in the third embodiment, a received signal is once converted to an intermediate frequency signal before demodulation, the received signal may be directly demodulated. Also, while two oscillator units are used to remove a frequency difference and a phase difference occurring during the synchronous detection, these differences may be removed by a single oscillator. Further, while the third embodiment controls the reference signal, the frequency and the phase of a signal to be converted to an intermediate frequency signal may be controlled.

Figure 16:
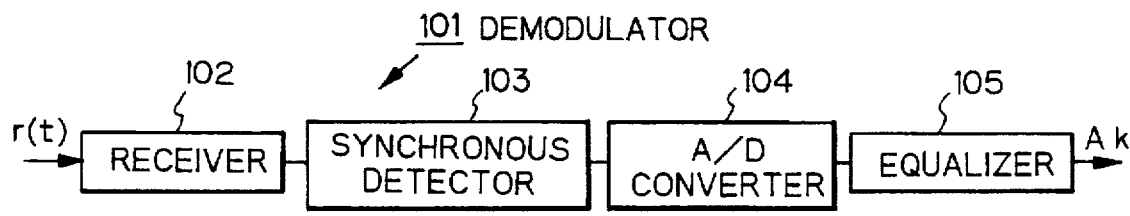
FIG. 16 is a block diagram illustrating the configuration of a demodulator according to a fourth embodiment of the present invention.

FIG. 16 is a block diagram illustrating the configuration of a demodulator according to a fourth embodiment of the present invention. A demodulator 101 comprises a receiver unit 102 for receiving a signal; a synchronous detector unit 103 for performing synchronous detection on the signal received by the receiver unit 102; an A/D convertor unit 104 for converting the synchronous detected signal into a digital form; and an equalizer unit 105 for equalizing the digital signal to detect symbols transmitted thereto (transmitted symbols).

The operation of the demodulator 101 in the fourth embodiment will be described below in detail. The receiver unit 2 receives a quadrature amplitude modulated signal. A received signal may be a radio signal or a signal on a wired coaxial cable. Assuming herein that a transmitted symbol $A_n$ is a complex number which randomly takes an arbitrary value, a received signal can be expressed by:

$$r(t) = Re\left[\sum_{n=-\infty}^{\infty} A_n H(t-nT)\exp(j2\pi f_c t)\right]$$

where $f_c$ is the frequency of a carrier, $A_n$ is a transmitted symbol, and T is a symbol interval.

The received signal r(t) received by the receiver unit 102 is inputted to the synchronous detector unit 103. Alternatively, the receiver unit 102 may be provided with a bandpass filter such that a signal at an arbitrary frequency is only inputted to the synchronous detector unit 103. In this latter case, even if signals multiplexed on a wired coaxial cable are received, a signal at an arbitrary frequency can be exclusively extracted and inputted to the synchronous detector unit 103.

Figure 17:
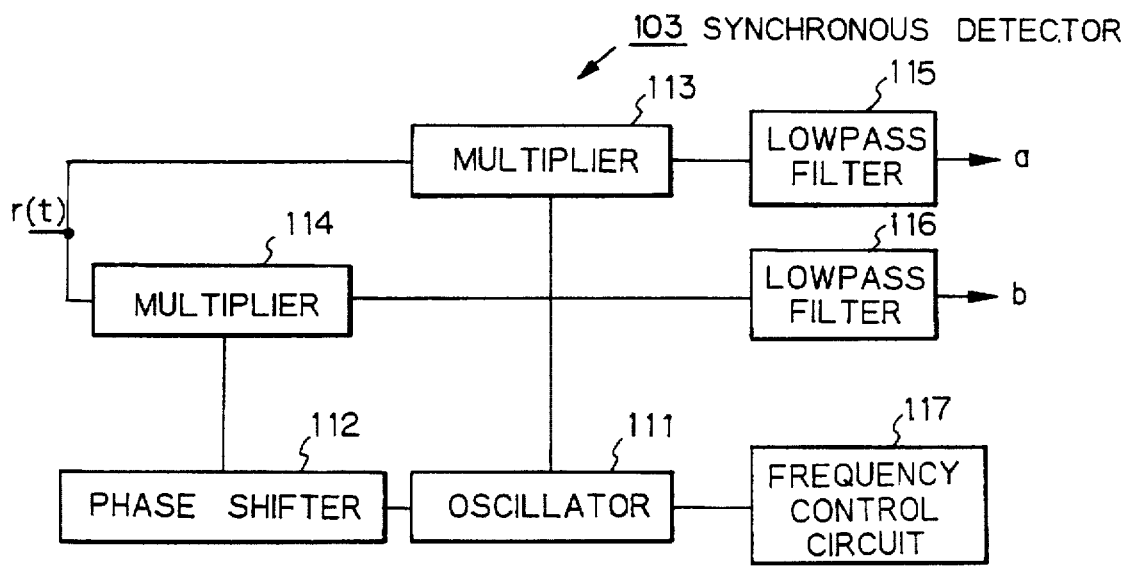
FIG. 17 is a block diagram illustrating the configuration of a synchronous detector unit in FIG. 16.

FIG. 17 is a block diagram illustrating the configuration of the synchronous detector unit 103. The synchronous detector unit 103 comprises an oscillator 111 for outputting a signal at an arbitrary frequency; a phase shifter 112 for shifting the phase of a signal outputted from the oscillator 111 by π/2; a multiplier 113 for multiplying the output of the oscillator 111 by a received signal; a multiplier 114 for multiplying an output of the phase shifter 112 by the received signal; low pass filters 115, 116 for removing harmonic components included in outputs of the multipliers 113, 114, respectively; and a frequency control circuit 117 for controlling the frequency of the signal outputted from the oscillator 111.

While the frequency of the signal outputted by the oscillator 111 is controlled by the frequency control circuit 117, since the frequency of the carrier of the received signal is very high, a large frequency deviation as compared with the base-band exists in the output frequency of the oscillator 111. In the synchronous detector unit 103, the output of the oscillator 111 is multiplied by the received signal in the multiplier 113, and the low pass filter 114 filters out harmonic components included in an output of the multiplier 113 to deliver a signal a which is free from harmonic components. Similarly, an output of the phase shifter 112 is multiplied by the received signal in the multiplier 114, and the low pass filter 116 filters out harmonic components included in an output of the multiplier 114 to deliver a signal b which is free from harmonic components. The signals a, b outputted from the low pass filters 115, 116 are given by:

Output of Low Pass Filter 115

$$Re\left[\sum_{n=-\infty}^{\infty} A_n H(t-nT)\exp(j2\pi\Delta f_c t)\right]$$

Output of Low Pass Filter 116

$$Im\left[\sum_{n=-\infty}^{\infty} A_n H(t-nT)\exp(j2\pi\Delta f_c t)\right]$$

where $\Delta f_c$ is a frequency deviation. These signals are inputted to the A/D convertor unit 104.

Figure 18:
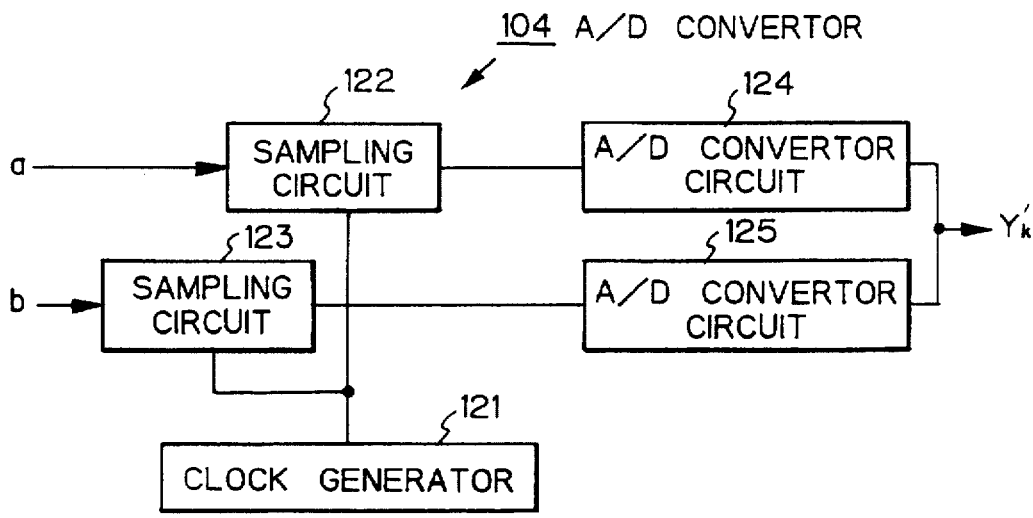
FIG. 18 is a block diagram illustrating the configuration of an A/D convertor unit in FIG. 16.

FIG. 18 is a block diagram illustrating the configuration of the A/D convertor unit 104. The A/D convertor 104 comprises a clock Generator circuit 121 for generating a sampling clock having a period T; sampling circuits 122, 123 for sampling the signals a, b outputted from the low pass filters 115, 116, respectively; and A/D convertor circuits 124, 125 for analog-to-digital converting outputs of the sampling circuits 122, 123, respectively.

In the A/D convertor unit 104, the sampling circuits 122, 123 sample the synchronous detected signals a, b based on the sampling clock outputted from the clock generator circuit 121, and the A/D convertor circuits 124, 125 analog-to-digital convert outputs of the sampling circuits 122, 123. The signals converted into digital form by the A/D convertor circuits 124, 125 are given by:

Output of A/D Convertor Circuit 124:

$$Re\left[\sum_{i=-\infty}^{\infty} A_{k-i} H_i \exp(j2\pi\Delta f_c kt)\right]$$

Output of A/D Convertor Circuit 125:

$$Im\left[\sum_{i=-\infty}^{\infty} A_{k-i} H_i \exp(j2\pi\Delta f_c kt)\right]$$

where $H_i = H(iT+\tau)$, and $\tau$ is a sampling phase shift. Here, the output signals of the A/D convertor circuits 124, 125 may be represented as a complex signal $Y_k$:

$$Y_k' = \left(\sum_{i=-\infty}^{\infty} A_{k-i} H_i \exp(j2\pi\Delta f_c kt)\right)$$

As will be apparent from this equation, if components associated with the frequency deviation (distorted frequency components) and components associated with the phase shift $\tau$ (distorted phase components) are removed, transmitted symbols $A_k$ are detected. In this embodiment of the invention, the equalizer unit 105, later described, is used to remove the distorted frequency components and the distorted phase components to detect the transmitted symbols $A_k$.

Figure 19:
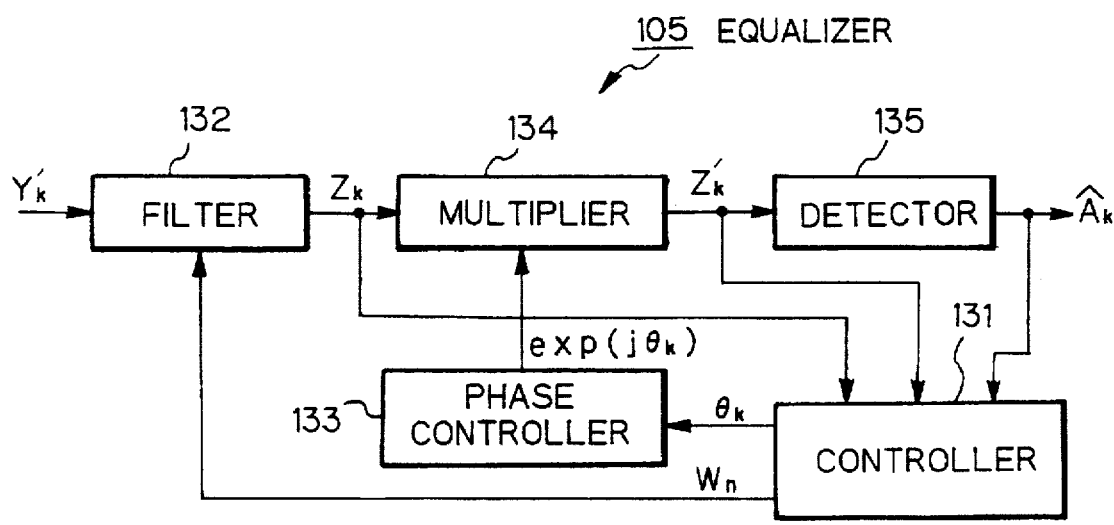
FIG. 19 is a block diagram illustrating the configuration of an equalizer unit in FIG. 16.

FIG. 19 is a block diagram illustrating the configuration of the equalizer unit 105. The equalizer unit 105 comprises a control unit 131 for calculating a tap gain $W_n$ and a phase control signal $\theta_k$, later described; a filter 132 for multiplying an input signal $Y_k$ by the tap gain $W_n$ calculated in the control unit 131 to produce a signal $Z_k$ and outputting the signal $Z_k$; a phase control unit 133 for outputting a signal $\exp(j\theta_k)$ based on the phase control signal $\theta_k$ calculated by the control unit 131; a multiplier circuit 134 for multiplying the output $Z_k$ of the filter 132 by the output $\exp(j\theta_k)$ of the phase control unit 133; and a detector unit 135 for performing coding processing on the output $Z_k$ of the multiplier circuit 134 to detect transmitted symbol $A_k$.

Assuming herein that the signal $Y_k$ inputted to the equalizer unit 105 is free from components associated with the frequency deviation $f_c$, the signal $Y_k$ may be expressed by:

$$Y_k = \sum_{i=-\infty}^{\infty} A_{k-i}H_i = A_k + \left\{ A_k(H_o - 1) + \sum_{i\neq 0} A_{k-i}H_i \right\}$$

Here, the transmitted symbols follow the same probability distribution irrespective of the time, and the probability density function $P_Y(\xi)$ of $Y_k$ is expressed by:

$$P_Y(\xi) = \int P_A(\xi-\mu)D(\mu)d\mu$$

Also, an expected value of a polynomial $R(Y_k)$ of a received signal $Y_k$:

$$R(Y_k) = \sum_{n=0}^{N} \alpha_n |Y_k|^n$$

is expressed by the following equation (1):

$$E\left[\sum_{n=0}^{N}\alpha_n|Y_k|^n\right]=\int P_Y(\xi)R(\xi)d\xi=\int\{\int P_A(\xi-\mu)R(\xi)d\xi\}D(\mu)d(\mu) \quad (1)$$

Now, analyzing in detail the equation (1), $$\int P_A(\xi-\mu)R(\xi)d(\xi)$$

is a unimodal function of $\mu$ (a monotonously increasing function for $|\mu|$) with $\mu=0$ being a minimum value when all $\alpha_n$ are positive. Therefore, the equation (1) presents a minimum value when $D(\mu)$ is a delta function. Thus, minimizing the equation (1), on condition that average power of $Y_k$ (average power of a received signal) is equal to average power of the transmitted symbols $A_k$, results in reducing inter-symbol interference to zero.

The filter 132 outputs the signal $Z_k$ which is the product of the tap gain $W_n$ calculated by the control unit 131 and the input signal $Y_k$ given by:

$$Z_k=\sum_{n=-N}^{N}Y_{k-n}W_n$$

For this signal $Z_k$, a cost function $f(Z_k)$ for minimizing its expected value as expressed below is derived by a variational method using Lagrange's undetermined coefficients:

$$f(Z_k)=\Sigma\alpha_n|Z_k|^n-\lambda|Z_k|^2$$

where $$\lambda=\Sigma\alpha_n n^{-1}E[|A_k|^n]/2^{-1}E[|A_k|^2]$$

Here, by solving a conditional variational problem that the expected value of the evaluation function $f(Z_k)$ is minimized on condition that the output power of $Z_k$ is made constant, a tap gain $W_n$ with inter-symbol interference equal to zero can be calculated.

Assuming herein $\alpha_8=1$ and $\alpha_n=0$ ($n\ne 8$), the cost function $f(Z_k)$ is given by:

$$f(Z_k)=|Z_k|^8-\lambda|Z_k|^2$$

This results in an algorithm (equation (2)) for calculating the tap gain $W_n$ for minimizing the expected value $E[f(Z_k)]$ of the cost function $f(Z_k)$ by a maximum gradient method.

$$W_n=W_n-\epsilon Y^*_{k-n}Z_k(|Z_k|^6-\lambda') \quad (n=-N,\ldots N) \quad (2)$$

where $\lambda'=E[|A_k|]^8/E[|A_k|]^2$, * represents a complex conjugate, and $\epsilon$ is a small positive value. Thus, when the control unit 131 calculates the tap gain $W_n$ based on the equation (2), inter-symbol interference of a signal $Z_k$ produced by multiplying a synchronous detected signal $Y_k$ outputted from the filter 132 can be reduced to zero. In other words, a signal $Z_k$ free from distorted frequency components included in the synchronous detected signal $Y_k$:

$$Z_k=|A_k|\exp(j\phi A)$$

is outputted. As is apparent from this equation, the output $Z_k$ of the filter 132 still includes a distorted phase component $\phi$. The detector unit 135 can detect the transmitted symbols $A_k$ by performing coding processing on outputs $Z_k$ having the distorted phase component $\phi$ which are an integer multiple of $\pi/2$. Thus, by controlling the distorted phase component to be an integer multiple of $\pi/2$, the equalization is completely achieved, enabling the detector unit 135 to detect the transmitted symbols $A_k$.

When the distorted phase component $\phi$ becomes equal to an integer multiple of $\pi/2$, the following equation (3) is satisfied:

$$Re[Z_k']^{2n-1}Im[Z_k']^{2n+1}-Re[Z_k']^{2n-1}Im[Z_k']^{2n+1}=0 \quad (3)$$

Here, the control unit 131 calculates a phase control signal $\theta_k$ by the following equations (4):

$$\Delta\theta_k=Re[Z_k']^{2n-1}Im[Z_k']^{2n+1}+Re[Z_k']^{2n-1}Im[Z_k']^{2n-1}$$

$$\theta_k'=\theta_k'+\Delta\theta_k$$

$$\theta_k=\theta_k-\beta_1\Delta\theta_k-\beta_2\Delta\theta_k' \quad (4)$$

Specifically, a value 2 is substituted into n in the equation (3) to derive a phase amount $\Delta\theta_k$ corresponding to a distorted phase component $\phi$ included in the output of the digital filter 132, and the phase control signal $\theta_k$ for removing the distorted phase component $\phi$ included in the output of the digital filter 132 is calculated from the phase amount $\Delta\theta_k$ and an integrated phase amount $\theta_k'$ which is derived by integrating $\Delta\theta_k$ in terms of the time. In this event, the calculated phase control signal $\theta_k$ will not diverge if sufficiently small values are selected for $\beta_1$ and $\beta_2$.

The phase difference control unit 133 outputs $\exp[j\theta_k]$ based on the phase control signal $\theta_k$ calculated in the above described manner. Then, the multiplier 134 multiplies the output $Z_k$ of the filter 132 by $\exp[j\theta_k]$ outputted from the phase control unit 133, whereby the distorted phase component $\phi$ included in the output $Z_k'$ of the multiplier 134 is gradually reduced, and finally eliminated. Thus, the signal $Z_k'$ completely free from the distorted phase component $\phi$ is inputted to the detector unit 135. Then, the detector unit 135 performs coding processing on the signal $Z_k'$ thus inputted thereto, to detect transmitted symbols $A_k$. An approach to remove distorted pulse waveforms included in a synchronous detected signal corresponds to a first distorted pulse waveform removing means (blind form), as is referred to in the present invention.

As described above, in the demodulator according to the fourth embodiment of the present invention, the equalizer unit 105 can completely remove distorted pulse waveforms included in synchronous detected signals, so that the demodulator can demodulate a quadrature amplitude modulated signal having a suppressed carrier to detect transmitted symbols $A_k$.

Generally, for reducing a time required to completely remove distorted pulse waveforms from a synchronous detected signal (transition from the start of reception to a fully receivable state), the equalizer unit 105 in the demodulator switches from the blind form to a symbol determining form for completely removing distorted pulse waveforms using detected transmitted symbols $A_k$ at the time an eye of the transmitted symbols $A_k$ detected by the detector unit 135 is open to some extent (at the time the distorted pulse waveforms included on the synchronous detected signal are removed to some extent).

The processing for the symbol determining form in this embodiment will be described below. In this embodiment, when a square root SQD of the output $Z_k'$ of the multiplier circuit 134 and a time average of a transmitted symbol $A_k$, expressed by the following equation, is below a predetermined value (threshold), it is determined that the eye is open to some extent and the equalizer unit 105 switches the blind form to the symbol determining form.

$$SQD=|Z_k'-\hat{A}_k|$$

where $\hat{A}_k$ represents a determination result.

A control procedure in the symbol determining form using detected transmitted symbols $A_k$ will be next described. In the symbol determining form, the control unit 131 uses the determination result to calculate a tap gain $W_n$ and a phase control signal $\theta_k$ by the following equations:

$$W_n = W_n - \epsilon' Y_{k-n}{}^* Z_k \theta_k / |Z_k'|^2 \quad (n=-N, \ldots, N)$$

$$\theta_k = |Z_k'| - |\hat{A}_k|$$

$$\Delta\phi_k = (-Re[Z_k']Im[\hat{A}_k] + Re[\hat{A}_k]Im[Z_k'])/|\hat{A}_k|^2$$

$$\theta_k' = \theta_k + \Delta\phi_k$$

$$\theta_k = \theta_k - \beta_1' \Delta\phi_k - \beta_2' \Delta\theta_k' \tag{5}$$

The equations (5) calculate the tap gain $W_n$ and the phase control signal $\theta_k$ based on a condition that a detected transmitted symbol $A_k$ is equal to an equalized signal $Z_k'$ in average power. The tap gain $W_n$ and the phase control signal $\theta_k$ are calculated by the equation (5), and an input signal is equalized to a synchronous detected signal by the digital filter 132, the phase control unit 133 and the multiplier circuit 134, as is the case of the blind form described above. In this way, by switching the blind form to the symbol determining form or adaptive mode in which the phase control signal $\theta_k$ and the tap gain $W_n$ are calculated using transmitted symbols $A_k$ detected after the eye has been opened to some extent, it is possible to reduce a time required to completely remove distorted pulse waveform components included in a synchronous detected signal. In addition, since the symbol determining form and the blind form use $\theta_k$, $\theta_k'$ and $\epsilon$ as common variables, the switching from the blind form to the symbol determining form is smoothly carried out. This symbol determining form corresponds to a second distorted pulse waveform removing means, as is referred to in the present invention.

As described above, the equalizer unit 105 calculates the tap gain $W_n$ and the phase control signal $\theta_k$ by the equations (2) and (4) in the blind form, and calculates the tap Gain $W_n$ and the phase control signal $\theta_k$ by the equations (5) in the symbol determining form. Then, the filter 132 multiplies a synchronous detected signal by the calculated tap gain $W_n$, and the multiplier circuit 134 multiplies the resultant signal $Z_k$ by $\exp(j\theta_k)$ outputted from the phase control unit 133 based on the phase control signal $\theta_k$ calculated in the control unit 131, thus removing distorted pulse waveforms from the synchronous detected signal. Then, the detector unit 135 detects transmitted symbols $A_k$ from the output $Z_k'$ of the multiplier circuit 134.

Figure 20:
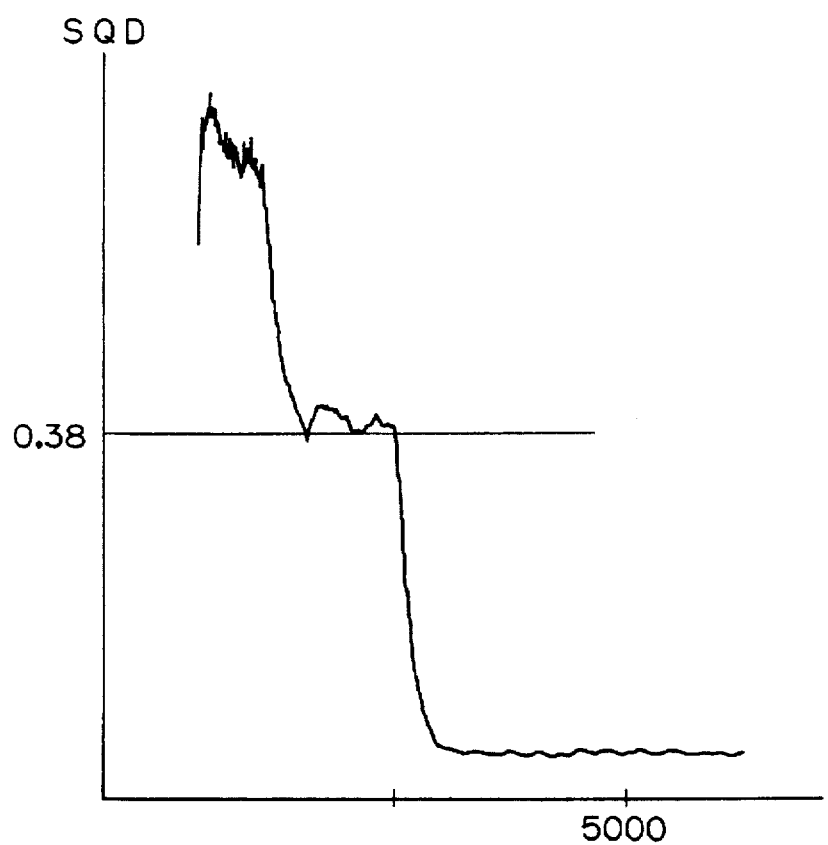
FIG. 20 is a graph illustrating the result of a simulation in the demodulator of the fourth embodiment.
Figure 21:
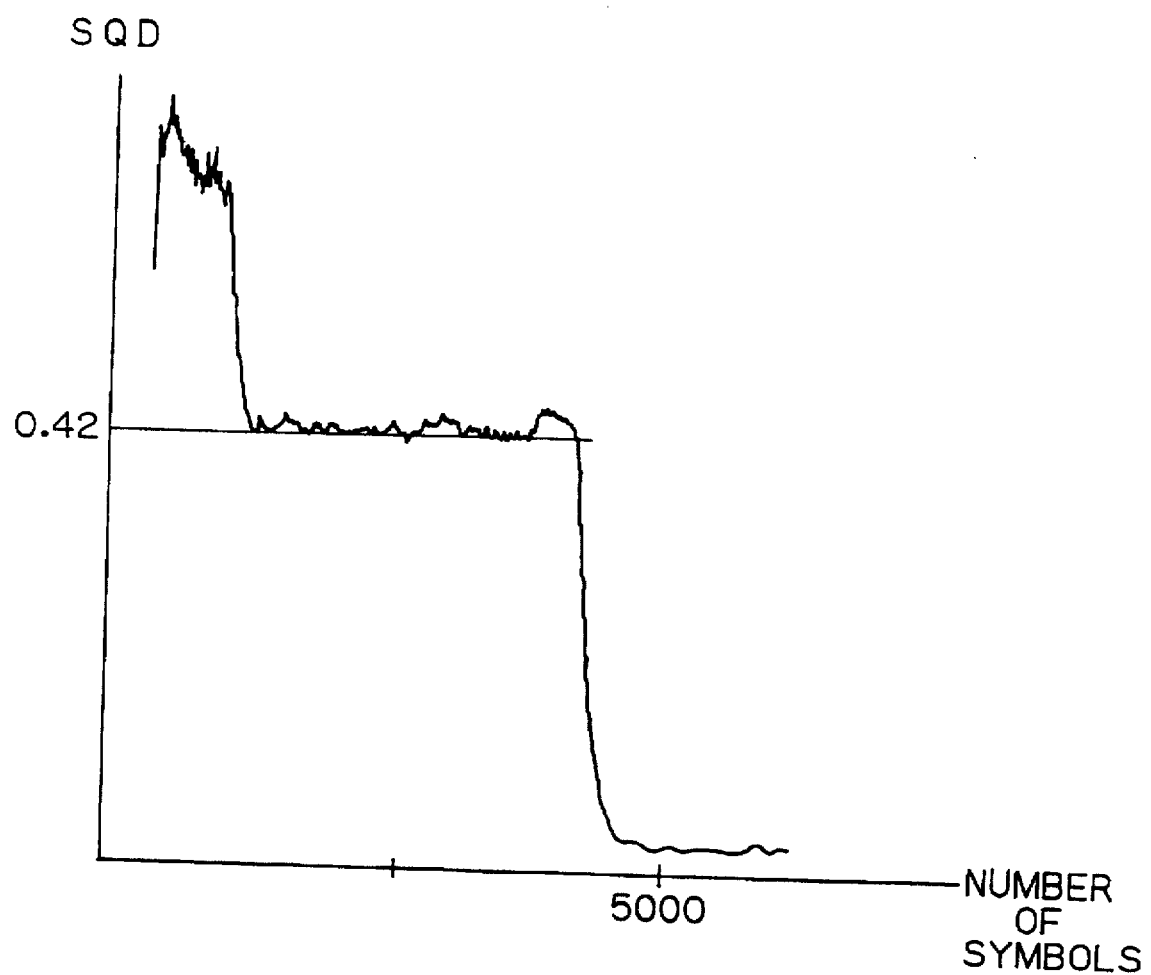
FIG. 21 is a graph illustrating the result of a simulation in the demodulator of the fourth embodiment.
Figure 22:
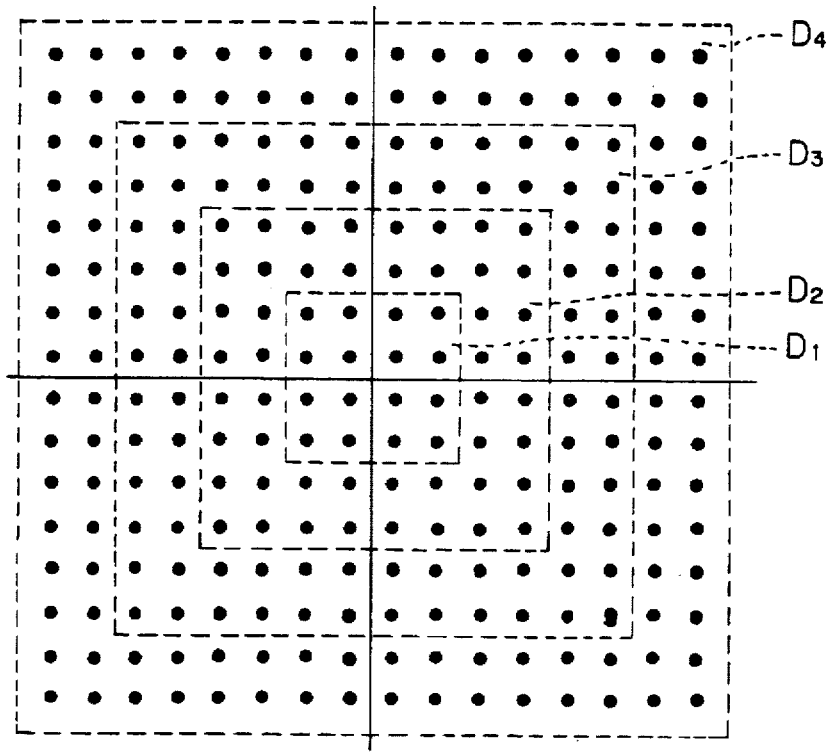
FIG. 22 is a diagram illustrating an example of how a signal point constellation zone is divided.

FIGS. 20 and 21 illustrate the results of simulations of the demodulator in the fourth embodiment, where the abscissa represents a number of received symbols, and the ordinate represents the SQD value. A threshold of SQD is set at 0.38 in FIG. 20 and at 0.42 in FIG. 21. Also, coefficients are set at the following values:

$\epsilon = 1 \times 10^{-11}$, $\epsilon' = 0.001$ $\beta_1 = 2 \times 10^{-8}$, $\beta_1' = 0.1$ $\beta_2 = 2 \times 10^{-10}$, $\beta_2' = 0.001$ In the simulation result illustrated in FIG. 20, the blind form is transitioned to the symbol determining form when approximately 20,000 symbols have been received, and distorted pulse waveform components are completely removed when approximately 30,000 symbols have been received, resulting in a fully receivable state with the eye completely opened. On the other hand, in the simulation result illustrated in FIG. 21, the blind form is transitioned to the symbol determining form when approximately 45,000 symbols have been received, and the fully receivable state is entered with the eye completely opened when approximately 55,000 symbols have been received. A data transmission rate employed in the simulations is 2 Mbit/sec. Also, in 256 QAM, one symbol includes eight bits. From these specific values, a time t required for the transition from the start of reception to the fully receivable state is calculated to be 0.12 seconds (t=30,000×8/2,000,000) in the simulation result illustrated in FIG. 20, whereas a time t required for the transition from the start of reception to the fully receivable state is calculated to be 0.22 seconds (t=55,000×8/2,000,000) in the simulation result illustrated in FIG. 21. It will be appreciated from these simulation results that a practical demodulator which can transition from the start of reception to the fully receivable state in a shorter time can be realized.

In the foregoing fourth embodiment, the entire SQD is monitored such that the blind form is switched to the symbol determining form with the fully opened eye when the SQD is equal to or less than a predetermined value. Alternatively, an entire symbol constellation zone may be divided into four areas based on the distance from the center of the zone, and the blind form may be switched to the symbol determining form to completely open the eye for each area. In this case, the SQD is calculated for each of the divided areas D1–D4. Also, it should be noted that since inner areas are less influenced by phase shift $\phi$ compared with outer areas, the blind form is switched to the symbol determining form orderly from the innermost area to the outermost area (the SQD becomes equal to or less than a threshold orderly from the innermost area).

Figure 23:
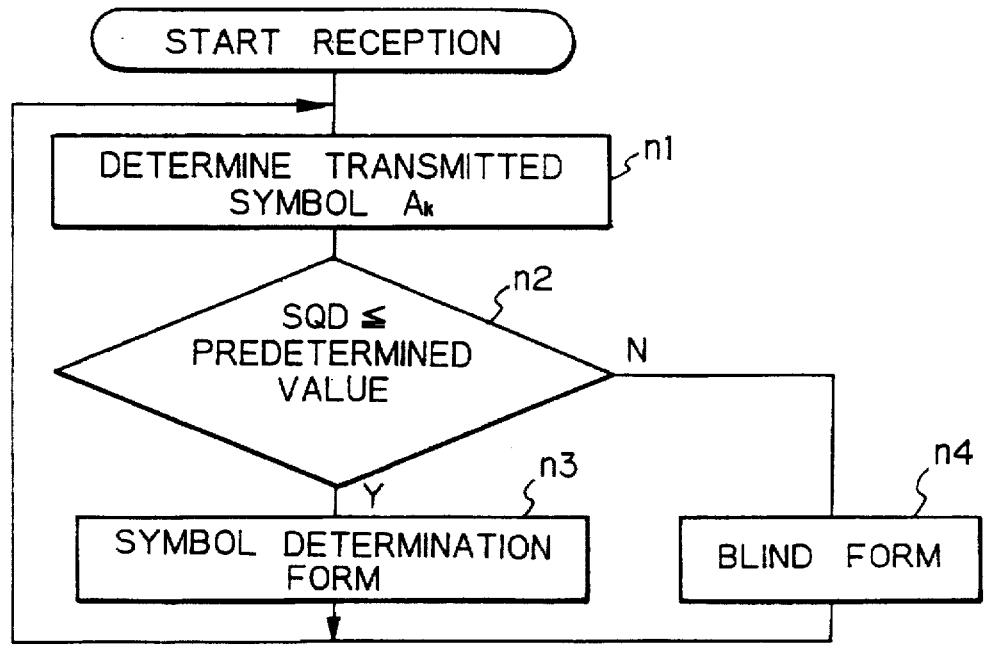
FIG. 23 is a flow chart representing switching control processing performed in the equalizer unit in the fourth embodiment of the present invention.

FIG. 23 is a flow chart representing a sequence of the switching control operations. When the detector unit 135 detects a transmitted symbol $A_k$ (step n1), the control unit 131 determines whether a SQD value for a area D1–D4 to which the signal point of the detected symbol belongs is smaller or greater than a threshold (step n2). If the SQD value is smaller than the threshold, the symbol determining form is entered to calculate a tap gain $W_n$ and a phase control signal $\theta_k$ for removing distorted pulse waveforms included in a synchronous detected signal, as described above (step n3). Subsequently, the flow jumps back to step n1, where the next transmitted symbol $A_k$ is determined. On the other hand, at step n2, if the threshold of the pertinent area D1–D4 is larger than the threshold, the blind form is entered to calculate a tap gain $W_n$ and a phase control signal $\theta_k$ for removing distorted pulse waveforms included in a synchronous detected signal, as described above (step n4). Then, the flow jumps back to step n1, where the next transmitted symbol $A_k$ is determined. For example, when the SQD values of the areas D1, D2 are smaller than the threshold and the SQD values of the areas D3, D4 are larger than the threshold, the blind form is entered if a transmitted symbol $A_k$ detected by the detector unit 135 belongs to the area D3 or D4, and the symbol determining form is entered if a transmitted symbol $A_k$ detected by the detector unit 135 belongs to the areas D1 or D2. Since the symbol determining form and the blind mode use $\theta_k$, $\theta_k'$ and $\epsilon$ as common variables, the switching from the blind form to the symbol determining form is smoothly carried out.

Figure 24:
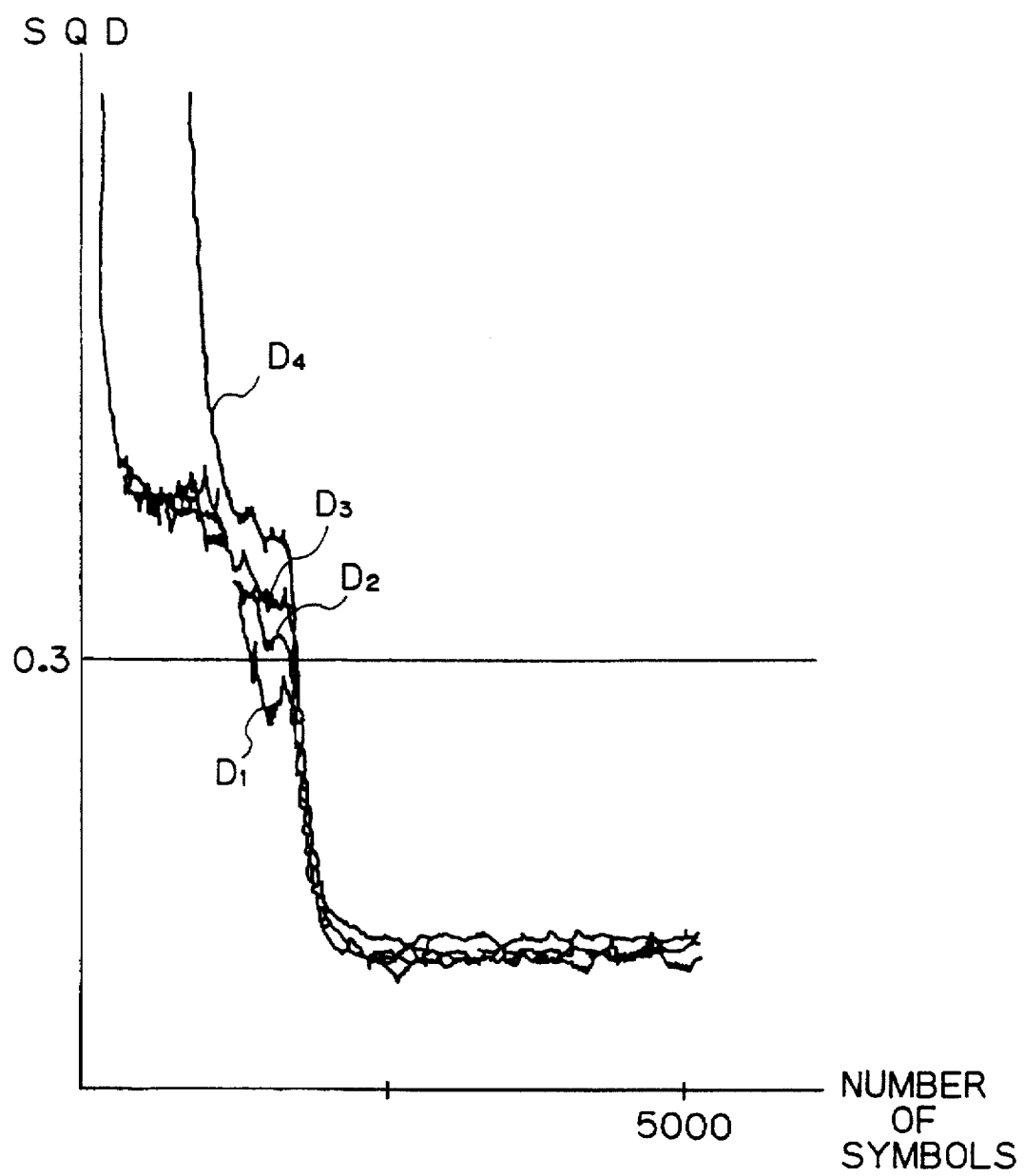
FIG. 24 is a graph illustrating the result of a simulation in the demodulator when a switching operation is performed.

FIG. 24 illustrates the result of a simulation in the demodulator according to the fourth embodiment, where the abscissa represents a number of received symbols, and the ordinate represents the SQD value. The value of SQD for determining the switching from the blind mode to the adaptive mode is selected to be 0.3. Also, the entire zone is divided into areas D1, D2, D3, D4 from the innermost one.

In this simulation, the SQD values decrease to equal to or less than the threshold in all the areas when approximately 20,000 symbols have been received, and the fully receivable state is entered when approximately 2,500,000 symbols have been received. The data transmission rate employed in this simulation is 2 Mbit/sec. Since one symbol comprises eight bits in 256 QAM, a time required to a transition from the start of reception to the fully receivable state in this simulation is calculated as follows:

$$t=25,000\times 8/2,000,000=0.1 \text{ sec.}$$

It will be understood that the time t required to the transition to the fully receivable state can be further reduced as compared with the aforementioned case where the symbol constellation zone is not divided into a plurality of areas based on the distance from the center thereof.

While the fourth embodiment has been described in connection with an example in which the zone is divided into four, it goes without saying that the number into which the zone is divided is not limited to this specific value but may be a smaller value such as two or three, or a larger value such as five or six than the specific value.

Next, a fifth embodiment of a demodulator according to the present invention will be described. Generally, when a quadrature amplitude modulated signal is received and demodulated, the received signal must be amplified with an appropriate amplification factor and sampled at appropriate timing to detect transmitted symbols from the received signal. The fifth embodiment has a configuration which satisfies such requirements.

Figure 25:
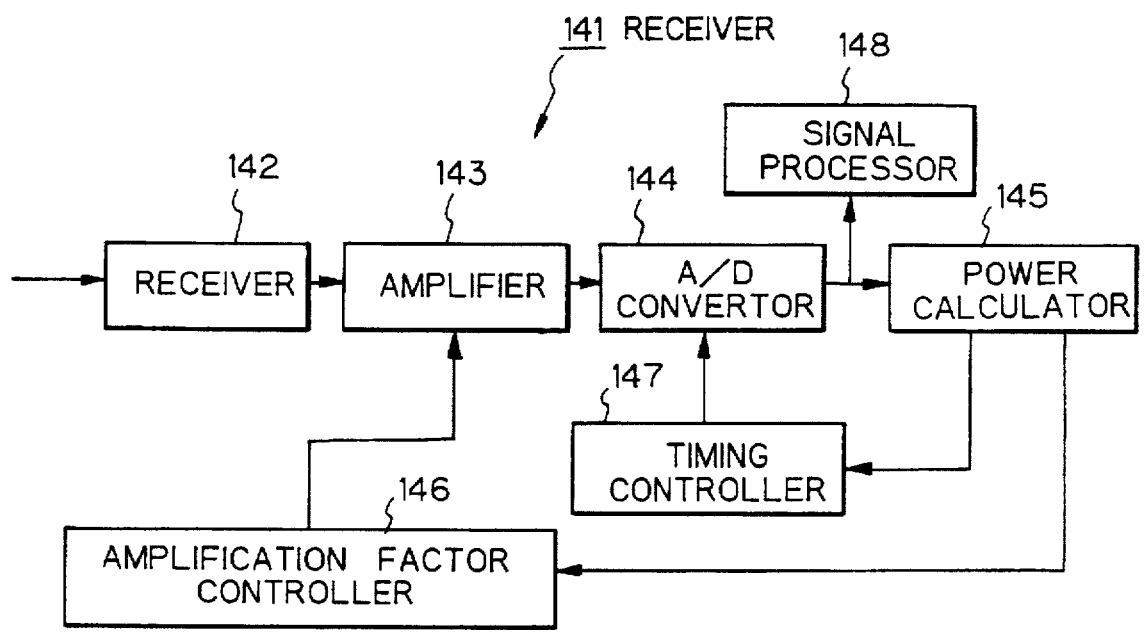
FIG. 25 is a block diagram illustrating the configuration of a receiver according to a fifth embodiment of the present invention.

FIG. 25 is a block diagram illustrating the configuration of a receiver comprising the demodulator according to the fifth embodiment of the present invention. A receiver 141 comprises a receiver unit 142; an amplifier unit 143; an A/D convertor unit 144; a power calculation unit 145; an amplification factor control unit 146; a timing control unit 147; and a signal processing unit 148. The receiver unit 142 receives a quadrature amplitude modulated signal which may be a radio signal or a signal transmitted thereto through a wired coaxial cable, and performs synchronous detection on the received signal. The amplifier unit 143 amplifies the synchronous detected signal and outputs the amplified signal. The A/D convertor unit 144 samples the received signal for A/D conversion. The power calculation unit 145 calculates the power of the A/D-converted signal. The amplification factor control unit 146 controls the amplification factor used in the amplifier unit 143 for amplifying the synchronous detected signal. The timing control unit 147 controls the sampling timing used in the A/D convertor unit 144 for sampling the received signal. The signal processing unit 148 detects transmitted symbols and performs processing in accordance with the detected transmitted symbols.

First, the basic theory underlying the present invention will be briefly described.

A distortion-free received signal Y(t) is given by:

$$Y(t) = D\Sigma A_k H(t - kT)$$

$$H(t) = \frac{\sin(\pi t/T)}{(\pi t/T)} * \frac{\cos(\pi\alpha t/T)}{(1 - 4\alpha^2(t/T)^2)}$$

where D is an attenuation factor, $\alpha$ is a roll off ratio, and $A_k$ is a transmitted symbol. When this signal is amplified with an amplification factor G, $$Y(t)=GD\Sigma A_k H(t-kT)$$

is given. Also, since H(t) is an impulse response of a cosine roll-off characteristic, H(nT)=0 is satisfied when H(0)=1 and t=nT (n≠0). Thus, a discrete signal Y(nT) sampled at timing t=nT is expressed by:

$$Y(nT)=G\cdot D\cdot A_n$$

At this time, if the amplification factor G is a value which satisfies G·D=1, $$Y(nT)=A_n$$

Thus, a transmitted symbol $A_n$ is accurately detected.

Generally, on the receiver side which receives signals transmitted thereto, a symbol transmission interval T is known, but the transmission timing of symbols is not known, so that received signals are sampled at sampling timing given by:

$$t=nT+\tau \ (0\leq\tau<T)$$

where $\tau$ is a sampling phase shift.

As is apparent from the foregoing description, the receiver side can accurately detect transmitted symbols from received signals by controlling the amplification factor G to satisfy G·D=1 and by controlling the sampling timing to be timing at which $\tau=0$ is satisfied.

Assume herein that transmitted symbols constitute an independent series. Under a condition given by:

$$E[A_n A_{n+L}^*]=0 \ (L\neq 0)$$

where * is represents a complex conjugate, the power of a discrete signal sampled at timing given by:

$$t=nT+\tau$$

is expressed by the following equation:

$$E[|Y(kT+\tau)|^2] = E[Y(kT+\tau)Y(kT+\tau)^*] = \quad (6)$$

$$(GD)^2 E[A_n A_n^*] \sum_{k=-\infty}^{\infty} H(kT+\tau)H(kT+\tau)^*$$

In the equation (6), $(GD)^2 E[A_n A_n^*]$ is a value not related to $\tau$. Also, a Fourier transform of H(t) is designated H(f), and under $$H(kT+\tau) = \int_{-\infty}^{\infty} H(f)\exp(j2\pi f\tau)\exp(-j2\pi f(kT))df \quad (7)$$

$$H\tau(f)=H(f)\exp(j2\pi f\tau)$$

is defined. When an integration interval is divided into [n/T−1/(2T), n/T+1/(2T)] (n is an integer), the equation (7) is transformed into:

$$H(kT+\tau) = \sum_{n=-\infty}^{\infty} \int_{n/T-1/(2T)}^{n/T+1/(2T)} H_\tau(f)\exp(-j2\pi f(kT))df \quad (8)$$

Further, directing attention to the fact that exp(−j2πf(iT)) is a periodic function of 1/T, the equation (8) can be expressed as follows:

$$H(kT+\tau) = \int_{-1/(2T)}^{1/(2T)} \{\Sigma H_\tau(f+n/T)\}\exp(-j2\pi f(kT))df \quad (8)$$

Also, if $H(f;\tau)=\Sigma H\tau(f+n/T)$, it can be said that H(iT−τ), which is a sampled value by a phase τ of an impulse response, is an $i^{th}$ order Fourier coefficient. Thus, the following equation is derived:

$$\sum_{k=-\infty}^{\infty} H(kT+\tau)H(kT+\tau)^* \qquad (9)$$

$$= \sum_{k=-\infty}^{\infty} |H(kT+\tau)|^2$$

$$= \sum_{k=-\infty}^{\infty} \int_{-1/(2T)}^{1/(2T)} H(\mu;\tau)\exp(-j2\pi\mu(kT))d\mu$$

$$\int \int_{-1/(2T)}^{1/(2T)} H(\nu;\tau)^*\exp(+j2\pi\nu(kT))d\nu$$

$$= \iint H(\mu;\tau)H(\nu;\tau)^*$$

$$\sum_{k=-\infty}^{\infty} \exp(-j2\pi(\mu-\nu)(kT))d\mu d\nu$$

In the equation (9), the infinite sum in the integration is:

$$\delta(\mu-\nu)=0(\mu\ne\nu),$$

and $$\iint \delta(\mu-\nu)d\mu d\nu=1$$

the square sum of the impulse response is given by the following equation:

$$\sum_{k=-\infty}^{\infty} |H(kT+\tau)|^2 = \int_{-1/(2T)}^{1/(2T)} |H(\xi;\tau)|^2 d\xi$$

Based on the theory described above, it can be said that when a basic interval $[-1/2T, 1/2T]$ centering on $f=0$ is extracted from a periodic function having a period T, made up of:

... $+H\tau(f-2/T)+H\tau(f-1/T)+H\tau(f) +H\tau(f+1/T)+H\tau(f+2/T)+$ ....

and square integration is calculated over the extracted basic interval, the power of a sampled received signal is proportional to the result of the square integration.

Here, since H(f) in an actual received signal is strictly rolled off, the first three terms only may be considered as its infinite sum. Thus, the power of the received signal is given by:

$$E[|Y_k|^2] = E[|A_k|^2] \int_{-1/(2T)}^{1/(2T)} |H_\tau(f-1/T) + H_\tau(f) + H_\tau(f+1/T)|^2 df$$

Also, with $f=1/(2T)$ Hz, the third term in $|H\tau(f-1/T)+H\tau(f)+H\tau(f+1/T)|^2$ may be ignored by roll-off, so that the following equation is given:

$$|H\tau(1/(2T) - 1/T) + H\tau 1/(2T))|^2 = \qquad (10)$$

$$|H\tau(-1/(2T))\exp(j2\pi\tau(2T)) + H\tau(1/(2T))\exp(-j2\pi\tau(2T))|^2$$

Normally, since the impulse response H(t) is not ensured to be a real function, it is not ensured to be a conjugate for a frequency characteristic H(f). For this reason, even if there is not a special relationship between $H(1/(2T))$ and $H(-1/(2T))$, the equation (10) presents zero without fail at any point when $\tau$ is changed from zero to T. In a normal received signal, this is a monotonous function having a maximum value and a minimum value within a range $0\le\tau<T$. Thus, it can be said that the power of a sampled received signal is a monotonous function having a maximum value and a minimum value in the range $0\le\tau<T$, and at $\tau$ giving the minimum, a null vector is realized by $f=1/(2H)$.

Figure 26:
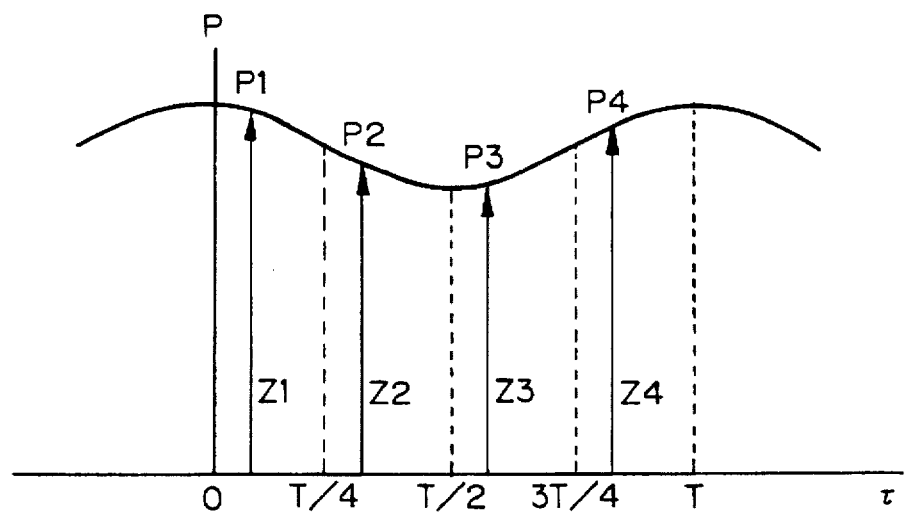
FIG. 26 is a diagram illustrating the power of a signal sampled at timing expressed by $t = n \cdot T + \tau$.

Based on this reasoning, the power of a received signal sampled at timing $t=n\cdot T+\tau$ ($0\le\tau<T$), is represented by a monotonous curve which presents a minimum value at $\tau=T/2$ and a maximum value at $\tau=0$ and $\tau=T$, as illustrated in FIG. 26.

In the following, the operation of the receiver 141 according to the fifth embodiment will be described in greater detail. The receiver unit 141 samples a received signal at the following four timing t1, t2, t3, t4:

t1=nT+τ t2=nT+τ+T/4 t3=nT+τ+2T/4 t4=nT+τ+3T/4

Signals sampled at these four timing outputted from the A/D convertor unit 144 are supplied to the power calculator unit 145.

Figure 27:
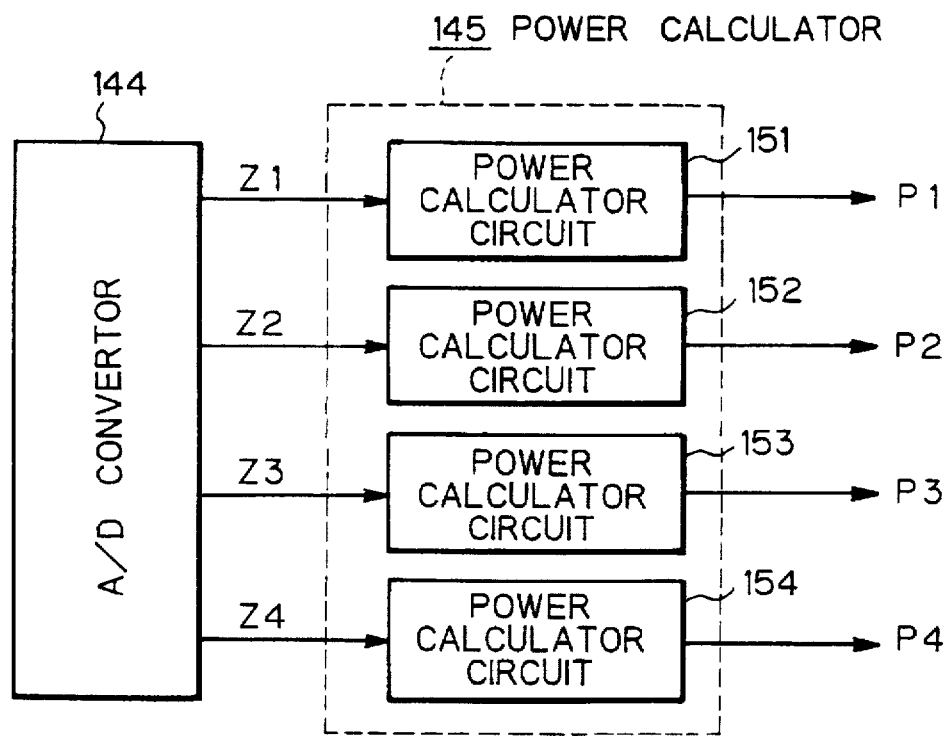
FIG. 27 is a block diagram illustrating the configuration of a power calculation unit in FIG. 25.

FIG. 27 is a block diagram illustrating the configuration of the power calculator unit 145. The power calculator unit 145 comprises four power calculator circuits 151–154. The respective power calculator circuits 151–154 are arranged to be fed with corresponding signals Z1–Z4 outputted from the A/D convertor unit 144. The power calculator circuits 151–154 calculate power P1–P4 of the respective signals inputted thereto and output the calculated power values. FIG. 26 illustrates the power P1–P4 outputted from the power calculator circuits 151–154, respectively. As is apparent from FIG. 26, when the difference between power P2 and power P4 is zero, the timing t2 is:

t2=nT+T/4 or t2=nT+3T/4 and it can be said that the timing t1 or t3 is optimal sampling timing in this case. It can be also said that the sum of the power P2 and P4 is proportional to the amplification factor G irrespective of τ.

Figure 28:
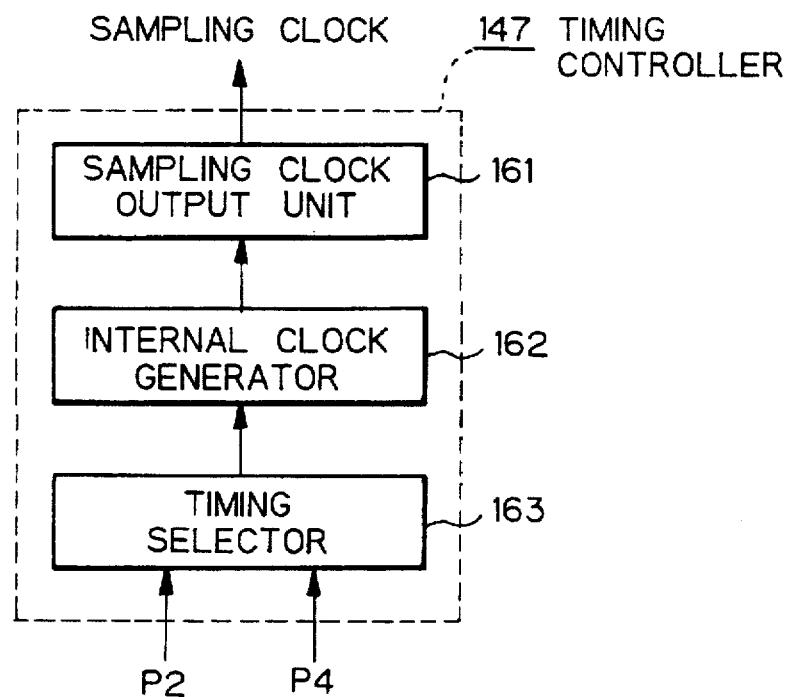
FIG. 28 is a block diagram illustrating a timing control unit in FIG. 25.

The timing control unit 147 receives the power P2, P4 and performs the following processing to control the sampling timing. The power P2 corresponds to the power of a first discrete signal, as is referred to in the present invention, and the power P4 corresponds to the power of a second discrete signal, as is referred to in the present invention. FIG. 28 is a block diagram illustrating the configuration of the timing control unit 147.

The timing control unit 147 comprises a sampling clock output unit 161 for outputting a sampling clock having a period T/4 (T is a symbol transmission interval); an internal clock generator unit 162 for generating clocks at intervals of T/64; and a timing selector unit 163 for controlling the timing of the sampling clock based on the difference between the received power P2 and P4 (P2–P4). In the timing control unit 147, the timing selector unit 163 selects a clock generated by the internal clock generator unit 162, and the sampling clock output unit 161 outputs the sampling clock having the period T/4 based on the generating timing of the selected clock. Specifically, when the timing selector unit 168 selects a clock A illustrated in FIG. 29, generated by the internal clock generator unit 162, the clock output unit 161 outputs a sampling clock a having the period T/4 based on the generating timing of the selected clock A (timing t1). Also, if the timing selector unit 163 selects a clock B instead of the clock A, this causes the sampling clock output unit 161 to output a sampling clock b, whereby the sampling timing is delayed. Further, if the timing selector unit 163 selects a clock C instead of the clock A, this causes the sampling clock output unit 161 to output a sampling clock c, whereby the sampling timing is advanced. In summary, the sampling timing is delayed or advanced by changing the internal clock selected by the timing selector unit 163.

Figure 29:
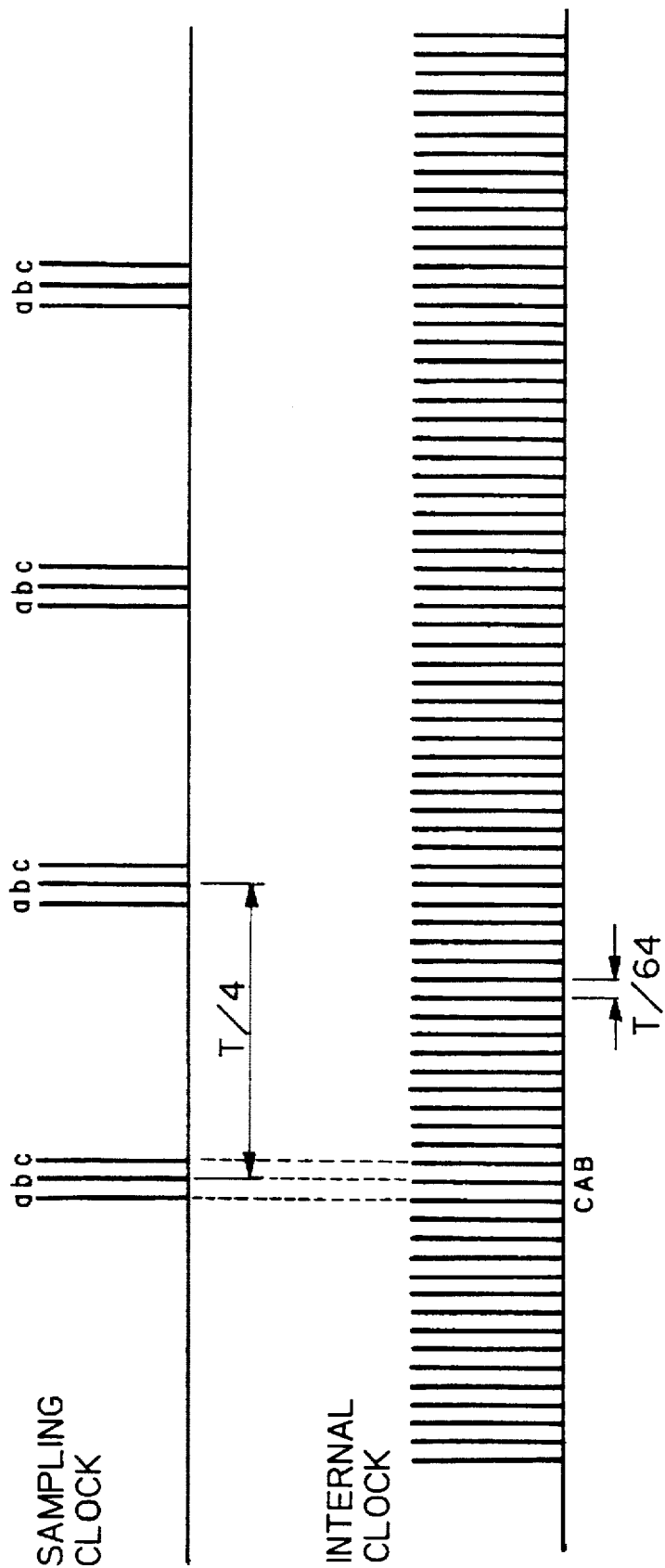
FIG. 29 illustrates waveform charts of a sampling clock and an internal clock.
Figure 30:
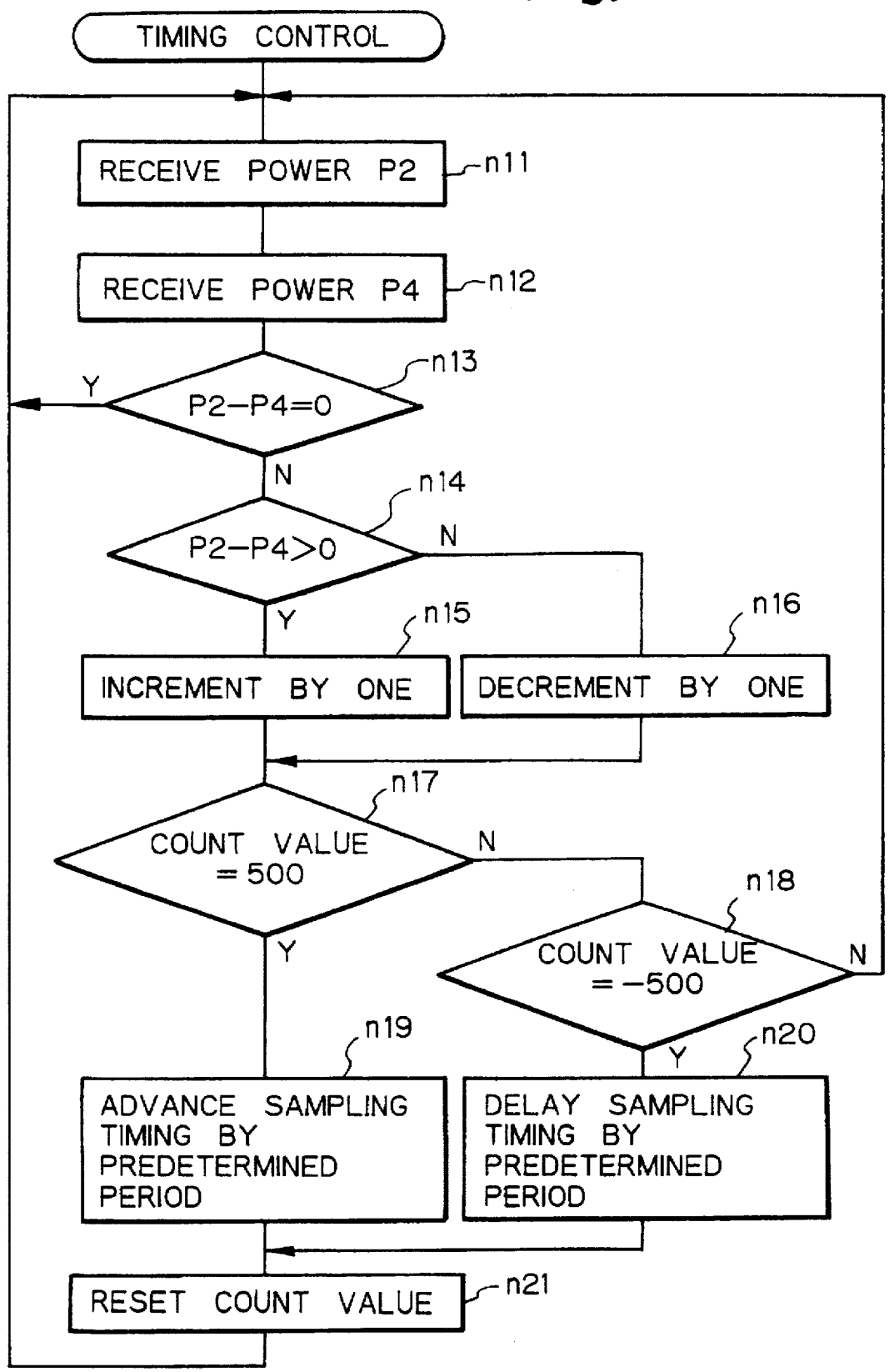
FIG. 30 is a flow chart representing a sequence of operations performed by a timing selector unit in FIG. 25.

FIG. 30 is a flow chart representing the processing executed by the timing selector unit 163. The timing selector unit 163 receives the power P2 and the power P4 every time the signal processing unit 148 outputs them (steps n11–n12). Then, if the difference between the power P2 and P4 is zero, the flow jumps back to step n11 (step n13). If P2–P4>0, a counted value of a counter, not shown, is incremented by one. Conversely, if P2–P4<0, the counted value of the counter is decremented by one (steps n14–n16). Then, it is determined whether the counted value has reached 500 or –500 (steps n17, n18). If the counted value has not reached 500 or –500, the flow jumps back to step n11. If the counted value presents 500, the sampling timing is delayed by selecting an internal clock one rank lower than a currently selected internal clock (step n19). On the other hand, if the counted value presents –500, the sampling timing is advanced by selecting an internal clock one rank higher than the currently selected internal clock (step n20). Then, the timing selector unit 163 resets the counted value, followed by the flow jumping back to step n11 (step n21). In FIG. 29, for example, when the clock A is originally selected, the counted value reaching 500 causes the timing selector unit 163 to select the clock B, while the counted value reaching –500 causes the timing selector unit 163 to select the clock C. By repetitively executing this processing, the phase of the sampling clock outputted from the sampling clock output unit 161 converges to the timing at which the difference between the power P2 and the power P4 is zero.

Figure 31:
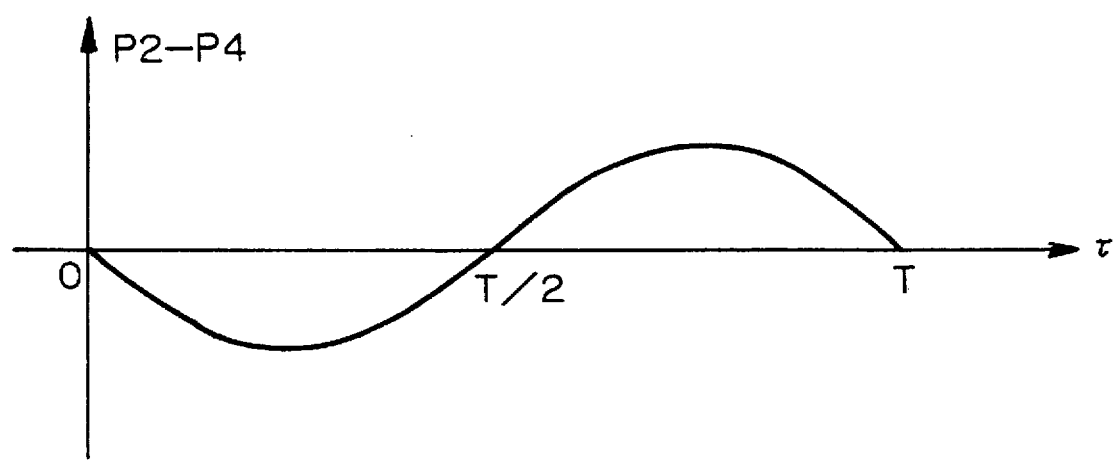
FIG. 31 is a graph showing the relationship between a difference between P2 and P4 (P2–P4) and $\tau$.

The difference P2–P4 is represented by a curve illustrated in FIG. 31 and is zero when τ is at 0, T/2, and T, as is also apparent from FIG. 26. It can be therefore said that when the difference between the power P2 and the power P4 is zero, the signal Z1 or Z3 corresponding to the larger one of the power P1 and the power P3 is a signal sampled at an optimal sampling timing. In other words, the signal Z1 or Z3 produced by sampling the received signal at the optimal sampling timing can be found out.

Next, how the amplification factor G is controlled is described. As is also apparent from FIG. 26, the sum of the power P2 and P4 is proportional to the amplification factor G irrespective of τ. For example, the sum of the power P2 and the power P4 is given by:

$$P2+P4=(GD)^2R$$

$$R=1.875E[A_nA_n^*]$$

in the receiver 141 with a roll-off ratio α being 25%. It should be noted that while the value of R depends on the roll-off ratio, the roll-off ratio is fixed at a predetermined value in the receiver 141, so that it can be said that the sum of the power P2 and the power P4 is a value proportional to the amplification ratio G. Thus, it will be appreciated that when the sum of the power P2 and the power P4 is equal to R, G·D=1 is satisfied, and the amplification factor G at this time is an optimal amplification factor.

Figure 32:
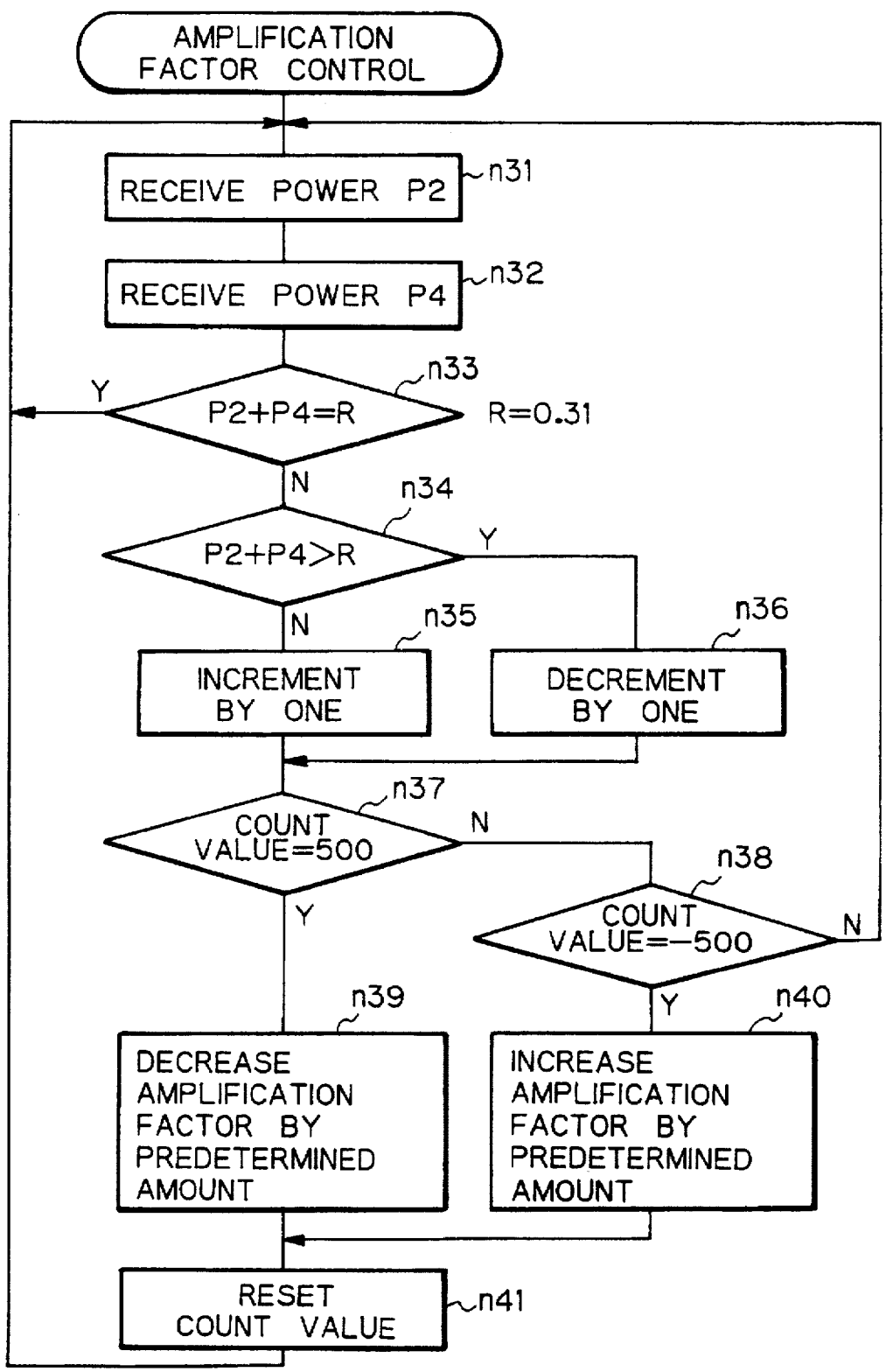
FIG. 32 is a flow chart representing a sequence of operations performed by an amplification factor control unit in FIG. 25.

FIG. 32 is a flow chart illustrating the processing executed by the amplification factor control unit 146. The amplification factor control unit 146 receives the power P2 and the power P4 every time they are outputted, and compares the sum of the power P2 and the power P4 with R serving as a reference value (steps n31–n34). If the comparison result shows P2+P4<R, a counted value of a counter, not shown, is incremented by one. Conversely, if P2+P4>R, the counted value of the counter, not shown, is decremented by one. Also, if P2+P4=R, the flow jumps back to step n31.

The amplification factor control unit 146 determines whether the counted value indicates 500 or –500 (steps n37, n38), and reduces the current amplification factor G by a predetermined value if the counted value indicates 500 (step n39), and increases the current amplification factor G by a predetermined value if the counted value indicates –500 (step n40). Then, the counted value is reset, followed by the flow jumping back to step n31 (step n41). By repeating the above processing, the amplification factor G converges to a value at which G·D=1 is satisfied, whereby an optimal amplification factor G is found.

As described above, the receiver 141 according to the fifth embodiment of the present invention independently executes the amplification factor control and the sampling timing control without any interference therebetween. Specifically, the amplification factor G can be brought to an optimal value even if the sampling timing control has not been completed, and conversely, optimal sampling timing can be provided even if the control of the amplification factor G has not been completed. This results in reducing a time required for a transition from the start of reception to a fully receivable state. In addition, since the amplification factor control does not interfere with the sampling timing control, these control operations can be designed independently of each other, thus facilitating the designing of the entire receiver. Moreover, since the configuration for implementing the control operations can be simplified, the manufacturing cost of the receiver 1 can be reduced.

Figure 33:
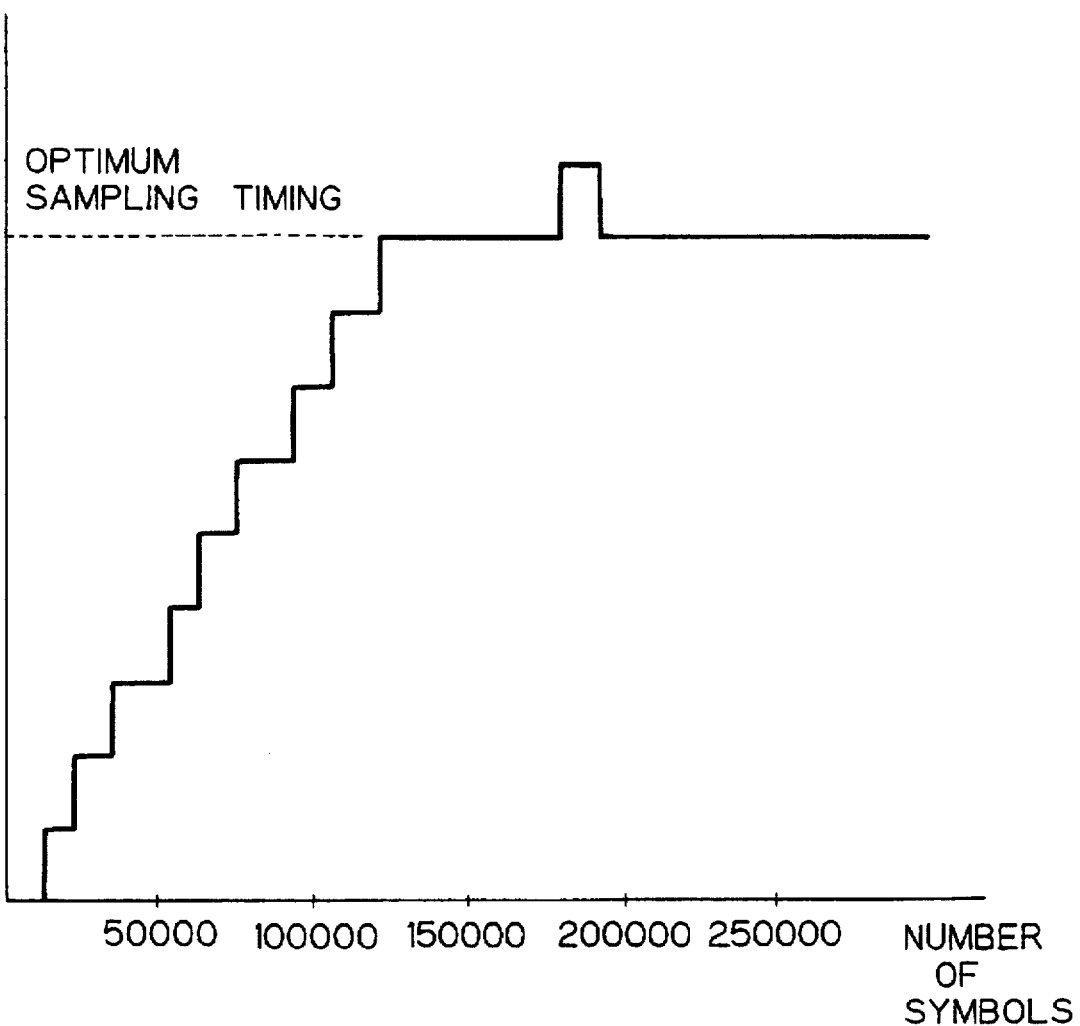
FIG. 33 is a graph illustrating the result of a simulation of a timing control.
Figure 34:
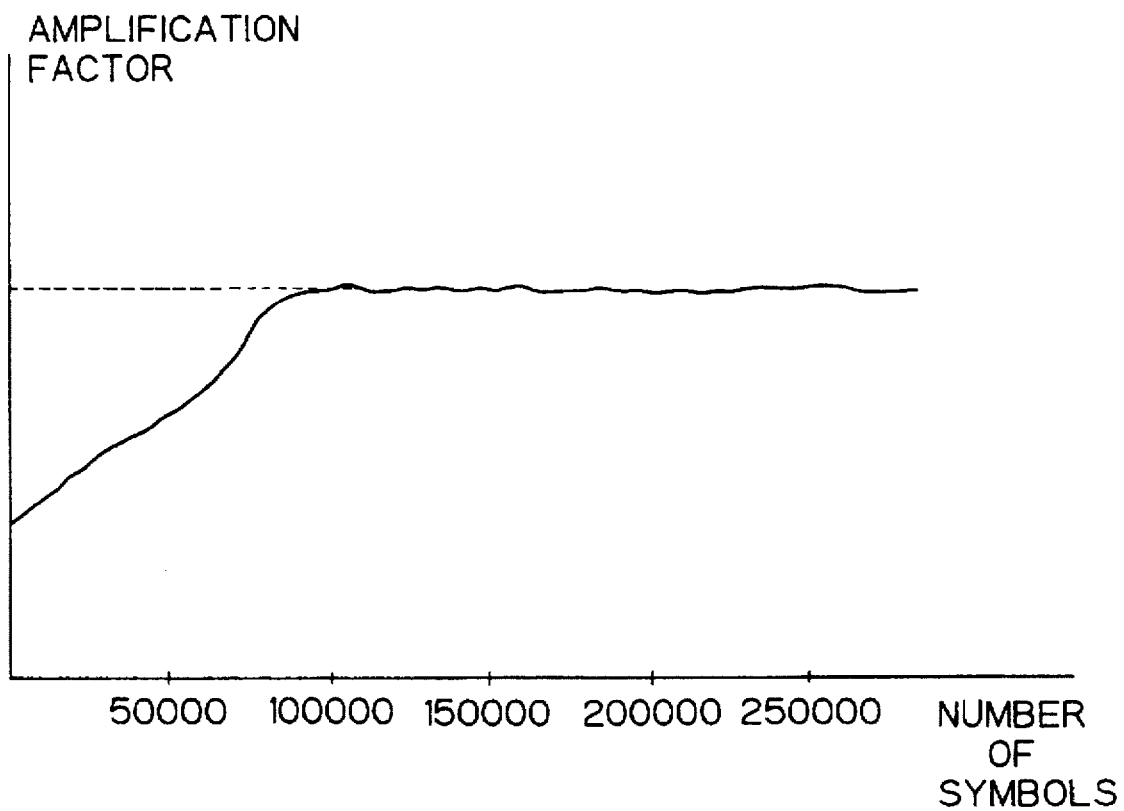
FIG. 34 is a graph illustrating the result of a simulation of an amplification factor control.

FIG. 33 illustrates the result of a simulation in which the sampling timing is controlled, and FIG. 34 illustrates the result of a simulation in which the amplification factor is controlled, in both of which the receiver 141 of the fifth embodiment is used.

In the simulations, the transmission rate of symbols in a received signal is selected to be 2 Mbit/sec. As illustrated in FIG. 33, an optimal sampling timing is found when 20,000 symbols have been received. Also, as illustrated in FIG. 34, the amplification factor can be controlled to be optimal when 100,000 symbols have been received. Since one symbol includes six bits in 64 QAM, a time period tS from the time the reception is started to the time the optimal sampling timing is found is calculated as follows:

$$tS=6 \text{ bits} \times 200{,}000 \text{ symbols}/2 \text{ Mbit/sec}=0.6 \text{ sec}$$

Also a time period tG from the time the reception is started to the time the optimal amplification factor is found is calculated as follows:

$$tG=6 \text{ bits} \times 100{,}000 \text{ symbols}/2 \text{ Mbit/sec}=0.3 \text{ sec.}$$

It should be noted that the fifth embodiment implements the control operations which change the sampling timing and the amplification factor when the counted value reaches 500 or –500, the present invention is not limited to employ these particular counted values as reference values. If a lower reference value is selected, the converging time can be further reduced. Conversely, if a higher counted value is selected, the sampling timing and the amplification factor can be controlled to stably converge to their respective optimal values without fluctuations. Furthermore, if the control operations are performed such that a lower reference value is initially set when the reception is started and the reference value is increased at the time the sampling timing and the amplification factors have converged to some extent, it is possible to reduce fluctuations and increase the converging speed.

While the present invention has been described in detail in connection with several embodiments thereof, the present invention is not at all limited to the described embodiments. It is apparent to those skilled in the art that a variety of variations and modifications can be made without departing from the spirit and scope of the present invention as defined by the following claims.

What is claimed is:

1. A quadrature amplitude modulation type demodulator having receiving means for receiving and outputting a quadrature amplitude modulated signal, an oscillator for outputting a reference signal, first demodulating means for multiplying a signal outputted by said receiving means by said reference signal to produce a first demodulated signal, second demodulating means for multiplying the signal outputted by said receiving means by a signal at a phase 90 degrees different from said reference signal to produce a second demodulated signal, and detecting means for detecting transmitted data from said first demodulated signal and said second demodulated signal, said quadrature amplitude modulation type demodulator comprising:

a first differentiating circuit for differentiating said first demodulated signal;

a second differentiating circuit for differentiating said second demodulated signal;

frequency difference detecting means for detecting a variate proportional to a difference in frequency between a carrier of the signal outputted by said receiving means and said reference signal, based on a signal produced by multiplying an output of said first differentiating circuit by said second demodulated signal and on a signal produced by multiplying an output of said second differentiating circuit by said first demodulated signal; and frequency control means for controlling the frequency of said reference signal outputted by said oscillator based on said variate proportional to the frequency difference detected by said frequency difference detecting means.

2. A quadrature amplitude modulation type demodulator having receiving means for receiving and outputting a quadrature amplitude modulated signal, an oscillator for outputting a reference signal, first demodulating means for multiplying a signal outputted by said receiving means by said reference signal to produce a first demodulated signal, second demodulating means for multiplying the signal outputted by said receiving means by a signal at a phase 90 degrees different from said reference signal to produce a second demodulated signal, and detecting means for detecting transmitted data from said first demodulated signal and said second demodulated signal, said quadrature amplitude modulation type demodulator comprising:

a first cubing circuit for cubing said first demodulated signal;

a second cubing circuit for cubing said second demodulated signal;

phase difference detecting means for detecting a phase difference based on a signal produced by multiplying said first demodulated signal by an output of said second cubing circuit and on a signal produced by multiplying said second demodulated signal by an output of said first cubing circuit; and phase rotating means for rotating the phase of said first demodulated signal and the phase of said second demodulated signal based on the phase difference detected by said phase difference detecting means.

3. A quadrature amplitude modulation type demodulator having receiving means for receiving and outputting a quadrature amplitude modulated signal, an oscillator for outputting a reference signal, first demodulating means for multiplying a signal outputted by said receiving means by said reference signal to produce a first demodulated signal, second demodulating means for multiplying the signal outputted by said receiving means by a signal at a phase 90 degrees different from said reference signal to produce a second demodulated signal, and detecting means for detecting transmitted data from said first demodulated signal and said second demodulated signal, said quadrature amplitude modulation type demodulator comprising:

a first differentiating circuit for differentiating said first demodulated signal;

a second differentiating circuit for differentiating said second demodulated signal;

frequency difference detecting means for detecting a variate proportional to a difference in frequency between a carrier of the signal outputted by said receiving means and said reference signal, based on a signal produced by multiplying an output of said first differentiating circuit by said second demodulated signal and on a signal produced by multiplying an output of said second differentiating circuit by said first demodulated signal;

frequency control means for controlling the frequency of said reference signal outputted by said oscillator based on said variate proportional to the frequency difference detected by said frequency difference detecting means;

a first cubing circuit for cubing said first demodulated signal;

a second cubing circuit for cubing said second demodulated signal;

phase difference detecting means for detecting a phase difference based on a signal produced by multiplying said first demodulated signal by an output of said second cubing circuit and on a signal produced by multiplying said second demodulated signal by an output of said first cubing circuit; and phase rotating means for rotating the phase of said first demodulated signal and the phase of said second demodulated signal based on the phase difference detected by said phase difference detecting means.

4. A demodulator having an oscillator, a receiver unit for receiving a quadrature amplitude modulated signal, a first synchronous detector circuit for multiplying a received signal by an output of said oscillator, a second synchronous detector circuit for multiplying the received signal by a signal at a phase shifted by 90 degrees from the phase of the output of said oscillator, and an equalizer circuit for equalizing two synchronous detected signals from said first synchronous detector circuit and said second synchronous detector circuit to detect transmitted symbols, wherein:

said equalizer circuit includes first distorted pulse waveform removing means for removing distorted frequency components included in the two synchronous detected signals base on average power of transmitted symbols and on average power of the received signal, and for removing distorted phase components included in the two synchronous detected signals based on a signal produced by multiplying an output of said first synchronous detector circuit raised to $(2n+11)^{th}$ power by an output of said second synchronous detector circuit raised to $(2n-1)^{th}$ power and on a signal produced by multiplying the output of said first synchronous detector circuit raised to $(2n-1)^{th}$ power by the output of said second synchronous detector circuit raised to $(2n+1)^{th}$ power, where n is an integer.

5. A demodulator according to claim 4, wherein:

said equalizer circuit further includes:

second distorted pulse waveform removing means for removing distorted pulse waveforms present in the two synchronous detected signals using average power of detected transmitted symbols and average power of an equalized received signal; and signal quality data calculating means for calculating signal quality data based on an time average of a difference in power between a distorted pulse waveform removed signal and the detected transmitted symbols, and said first distorted pulse waveform removing means is stopped when said signal quality data is equal to or less than a predetermined value, and said second distorted pulse waveform removing means removes distorted pulse waveforms present in the two synchronous detected signals.

6. A demodulator according to claim 5, wherein:

said signal quality data calculating means is means for calculating said signal quality data for each of areas divided from a symbol constellation zone based on the distance of the center thereof; and said equalizer circuit switches said first distorted pulse waveform removing means to said second distorted pulse waveform removing means for each of the areas.

7. A method of detecting transmitted symbols from a received signal comprising the steps of:

calculating a sum of the power of a first discrete signal produced by sampling the received signal at periods equal to transmission intervals of transmitted symbols and the power of a second discrete signal produced by sampling the received signal at sampling timing shifted by one half of the transmission interval with respect to said first discrete signal; and controlling an amplification factor for the received signal based on said sum.

8. A method of detecting transmitted symbols according to claim 7, wherein:

the sampling timing of the received signal is controlled based on a difference in power between said first discrete signal and said second discrete signal.

9. A receiver comprising:

first sampling means for sampling a received signal at periods equal to transmission intervals of transmitted symbols to detect a first discrete signal;

second sampling means for sampling the received signal at sampling timing shifted by one half of said transmission interval with respect to the sampling timing of said first sampling means to detect a second discrete signal; and amplification factor control means for controlling an amplification factor for the received signal based on a sum of power of said first discrete signal and power of said second discrete signal.

10. A receiver according to claim 9, further comprising a timing control means for controlling the sampling timing of the received signal based on a difference in power between said first discrete signal and said second discrete signal.

* * * * *